US012743413B1

(12) United States Patent
Paliwal et al.

(10) Patent No.: US 12,743,413 B1
(45) Date of Patent: Sep. 22, 2026

(54) MAINTAINING A CURRENT AND A HISTORICAL REPRESENTATION OF A TRANSACTIONAL DATABASE AT AN ANALYTICAL DATABASE

(71) Applicant: Amazon Technologies, Inc., Seattle, WA (US)

(72) Inventors: Gopal Paliwal, Pleasanton, CA (US); Gokul Soundararajan, San Jose, CA (US); Jyoti Aggarwal, Seattle, WA (US); Ippokratis Pandis, Menlo Park, CA (US); Aleksandr Chumachenko, Karlsruhe (DE)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 18/896,614

(22) Filed: Sep. 25, 2024

(51) Int. Cl.
*G06F 16/23* (2019.01)

(52) U.S. Cl.
CPC ...... *G06F 16/2379* (2019.01); *G06F 16/2358* (2019.01)

(58) Field of Classification Search
None
See application file for complete search history.

(56) References Cited

U.S. PATENT DOCUMENTS 10,002,175 B2 6/2018 Kemper et al.
10,372,926 B1 8/2019 Leshinsky et al.
10,929,428 B1 2/2021 Brahmadesam
11,200,332 B2 12/2021 Leshinsky et al.
11,842,085 B1 12/2023 Sreekantham et al.
12,007,983 B2 6/2024 Pandis et al.
12,216,653 B1 2/2025 Papathanasiou et al.
12,277,138 B2 4/2025 Pandis et al.
2010/0191713 A1 7/2010 Lomet
2011/0320403 A1 12/2011 O'Krafka et al.
2013/0073513 A1 3/2013 Kemper et al.

(Continued)

FOREIGN PATENT DOCUMENTS

EP 2467791 6/2012
EP 3961420 3/2022

OTHER PUBLICATIONS

Zhang, Huanchen, et al., "Reducing the Storage Overhead of Main-Memory OLTP Databases with Hybrid Indexes", ACM SIGMOD' 16 (2016), 15 pages. (Year: 2016).*

(Continued)

*Primary Examiner* — Scott A. Waldron
(74) *Attorney, Agent, or Firm* — Alexander A. Knapp; Kowert, Hood, Munyon, Rankin & Goetzel, P.C.

(57) ABSTRACT

Systems and methods for managing a representation of a transactional table of a transactional database in an analytical database in near real-time are disclosed. A historical mode enables the analytical database to maintain both a current representation of the transactional table, but also one or more historical representations. The table representation maintained by the analytical database can enter and exit the historical mode without a need for re-start. For example, additional columns specifying whether a given row is active and what transaction numbers it was active for, are added to allow the historical representations to be included in the same table with the current representation.

20 Claims, 21 Drawing Sheets

| | | A | ... | N | Is active? | Transaction start | Transaction end |
|---|---|---|---|---|---|---|---|
| Current row 1 version | 1 | Act 1 | Balance $0 | Delivery: Completed | Yes | 160 | |
| Historical row 2 version | 2* | Act 2 | Balance $0 | Delivery: Completed | No | 172 | 173 |
| | ⋮ | | | | | | |
| Historical row N version | N* | Act X | Balance $100 | Delivery: Sept. | No | 152 | 175 |
| Current row 2 version | 2 | Act 2 | Balance $0 | Returned | Yes | 173 | |
| Current row N version | N | Act X | Balance $0 | Delivery: Completed | Yes | 175 | |

(56) References Cited

U.S. PATENT DOCUMENTS

2014/0279962 A1* 9/2014 Schreter .............. G06F 16/1724
707/693
2015/0046413 A1 2/2015 Andrei
2016/0299932 A1 10/2016 Pound et al.
2018/0322149 A1 11/2018 Vermeulen et al.
2019/0294204 A1 9/2019 Castro et al.
2019/0324866 A1 10/2019 Bensberg et al.
2019/0384775 A1 12/2019 Wen et al.
2020/0210412 A1 7/2020 van Gulik et al.
2020/0293545 A1* 9/2020 Li ....................... G06F 16/2282
2021/0382877 A1 12/2021 Li
2022/0027372 A1 1/2022 Schreter
2022/0100883 A1 3/2022 Leshinsky et al.
2022/0171739 A1 6/2022 Xiang
2022/0197873 A1* 6/2022 Freedman ............... G06F 16/21
2022/0318223 A1 10/2022 Ahluwalia et al.
2023/0062198 A1 3/2023 Chen et al.
2024/0004897 A1* 1/2024 Pandis .................... G06F 16/23
2025/0068640 A1* 2/2025 Dharamshi ........... G06F 16/172

OTHER PUBLICATIONS

Manassiev, et al., “Exploiting Distributed Version Concurrency in a TransactionalMemory Cluster,” PPoPP’06, 2006 ACM, pp. 1-11.

* cited by examiner

| | | A | ... | N | Is active? | Transaction start | Transaction end |
|---|---|---|---|---|---|---|---|
| Current row 1 version | 1 | Act 1 | Balance $0 | Delivery: Completed | Yes | 160 | |
| Historical row 2 version | 2* | Act 2 | Balance $0 | Delivery: Completed | No | 172 | 173 |
| | ⋮ | | | | | | |
| Historical row N version | N* | Act X | Balance $100 | Delivery: Sept. | No | 152 | 175 |
| Current row 2 version | 2 | Act 2 | Balance $0 | Returned | Yes | 173 | |
| Current row N version | N | Act X | Balance $0 | Delivery: Completed | Yes | 175 | |

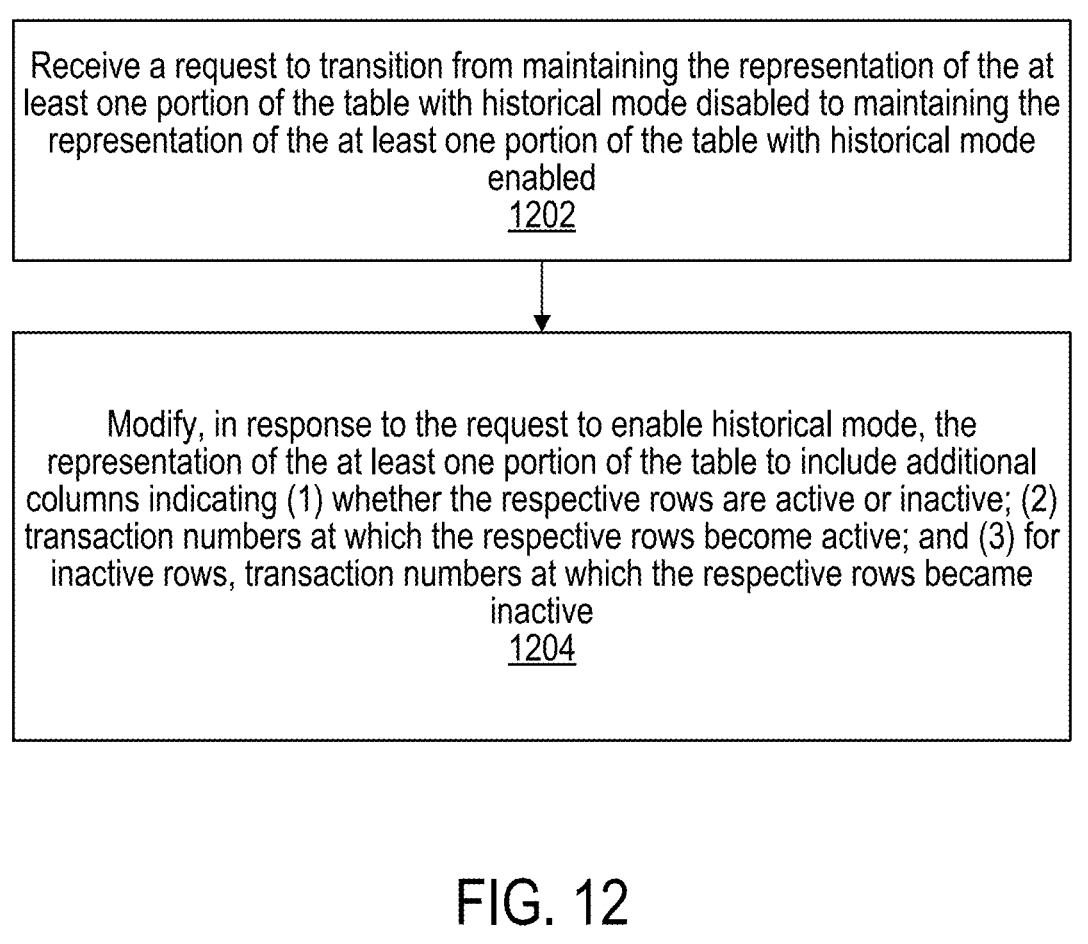

Receive a request to transition from maintaining the representation of the at least one portion of the table with historical mode disabled to maintaining the representation of the at least one portion of the table with historical mode enabled
1202

Modify, in response to the request to enable historical mode, the representation of the at least one portion of the table to include additional columns indicating (1) whether the respective rows are active or inactive; (2) transaction numbers at which the respective rows become active; and (3) for inactive rows, transaction numbers at which the respective rows became inactive
1204

FIG. 12

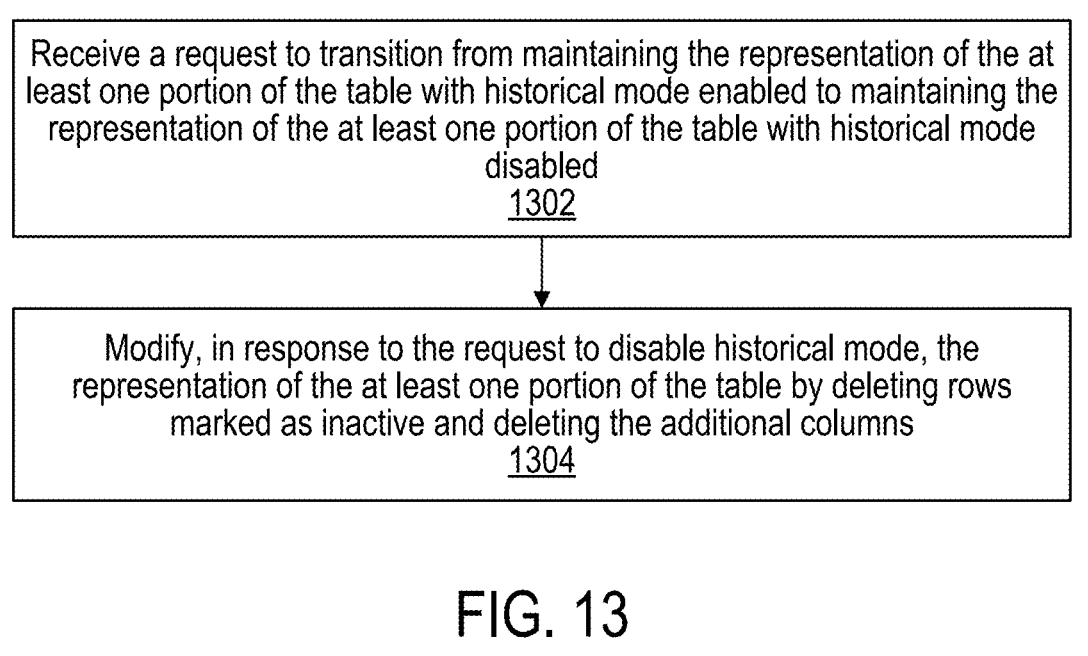

Receive a request to transition from maintaining the representation of the at least one portion of the table with historical mode enabled to maintaining the representation of the at least one portion of the table with historical mode disabled
1302

Modify, in response to the request to disable historical mode, the representation of the at least one portion of the table by deleting rows marked as inactive and deleting the additional columns
1304

FIG. 13

MAINTAINING A CURRENT AND A HISTORICAL REPRESENTATION OF A TRANSACTIONAL DATABASE AT AN ANALYTICAL DATABASE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing and querying. Challenges in obtaining the right configuration of data storage, processing, and querying, such that these database systems may be efficiently configured to perform various functions for different workloads occurs frequently.

BRIEF DESCRIPTION OF THE DRAWINGS

FIG. 12 is a flowchart illustrating a process of transitioning an existing table in an analytical base into a history mode, according to some embodiments.

FIG. 13 is a flowchart illustrating a process of exiting history mode for a table of an analytical database, according to some embodiments.

Figure 1:
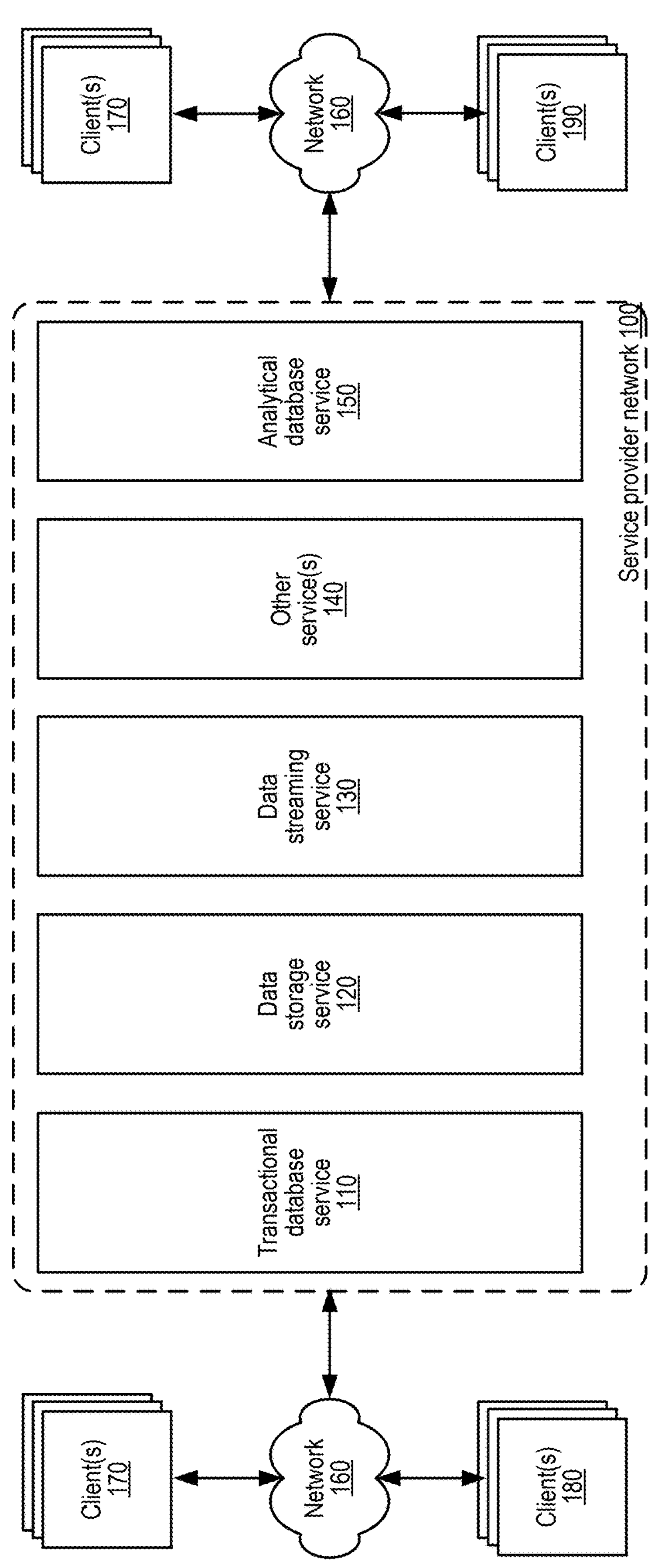
FIG. 1 illustrates a service provider network that includes at least a transactional database service and an analytical database service such that clients of the service provider network may both maintain transactional data and run analytical queries against the transactional data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques pertaining to a hybrid transactional and analytical processing (HTAP) service are described. In some embodiments, a hybrid transactional and analytical processing system, which may implement at least a transactional database and an analytical database, may be used to maintain tables of transactional data at the transactional database, and maintain replicas of said tables at the analytical database. Such a hybrid transactional and analytical processing service may be optimized for both online transaction processing (OLTP) and online analytical processing (OLAP) related services, according to some embodiments. In order to maintain the replicas, or representations, of the transactional tables at the analytical database, a change-data-capture log of transactional changes made to the tables at the transactional database may be provided to the analytical database and incrementally applied and committed to the representations.

Running analytical queries against a transactional data store of the transactional database may impact the performance of the transactional queries, impact the performance of the computing resources of the transactional database, and, in some cases which may require leveraging materialized views and/or special indices, lead to a complex and/or challenging organization of database resources. In addition, scaling the structure of the transactional data stores of the transactional database such that they may be configured to treat analytical queries may be costly. On the other hand, "offloading" transactional data to an analytical database that is more optimized for analytical queries and analytical query management may be difficult to manage manually and/or lead to a lag (e.g., stale data). Techniques proposed herein, however, overcome these challenges by making use of the analytical database for running analytical queries against transactional data while minimizing the lag between the transactional data stored on the transactional database and the "offloaded" transactional data replications maintained on the analytical database, resulting in real-time analytics on data.

More particularly, in some embodiments, customers of such a hybrid transactional and analytical processing (HTAP) service may wish to be able to maintain both current and historical table data in the analytical database representation of the transactional table. For example, maintaining historical rows at the transactional database may be inefficient as the transactional database uses more expensive storage due to the requirement that each row be stored with all columns of the row. Also, more expensive storage may be used at the transactional database in order to achieve high transactional throughput. However, less expensive storage that is formatted in a more manageable manner, e.g. using limited sized data bocks that correspond to individual columns, and which may be sharded (or sliced) provides a more efficient mechanism to store historical table data. Additionally, customers may desire to be able to switch into and out of a historical mode in the analytical database representation seamlessly, e.g. without having to re-initiate table replication via a new snapshot. As discussed in more detail herein, in some embodiments, an analytical database system may be configured to enter and exit historical mode by adding additional columns to an existing table (when entering historical mode) and by deleting inactive rows and removing the additional columns (when exiting historical mode).

It should be noted that while various examples described herein a given in the context of change-data-capture information being transported from a transactional database system to an analytical database system that implements history mode, in some embodiments, the source of the changes may be any system that generates changes to be applied to the table representation maintained by the analytical database, such as a data streaming service.

In some embodiments, history mode provides an ability to a destination system (such as an analytical database) to update records to a latest version and also to retain the older versioned records. It does so, at least in part, by performing soft-deletes on the existing versions of the records when newly updated versions of the records are replicated to the destination system (e.g., analytical database). This allows users to seamlessly capture the history of a table even when data from the source is altered/deleted. Such capability of retaining can be achieved for all the tables a user is replicating or for only as subset of tables. In some embodiments, an analytical database system does this by automatically adding extra columns to an existing table (e.g., columns for _is_active, is_start_time, is_delete_time) when they move into the history mode.

It should further be noted that the seamless method of entering and exiting history mode described herein allows downstream applications that query the table representation in the analytical database to continue formatting queries in the same way even when the table being queried moved into, or out of, historical mode.

This specification continues with a general description of a service provider network that implements a hybrid transactional and analytical processing service, including a transactional database service and an analytical database service, that is configured to maintain transactional data, allow for querying against the transactional data, and support multi-version concurrency control (MVCC). Then, various examples of the hybrid transactional and analytical processing service, including different components/modules, or arrangements of components/module that may be employed as part of implementing the services are discussed. A number of different methods and techniques to maintain a representation in the analytical database service of a transactional table of the transactional database service are then discussed, some of which are illustrated in accompanying flowcharts. For example, methods and techniques for entering and exiting historical mode as well as methods and techniques for performing a handshake protocol that may define parameters and functionalities of the hybrid transactional and analytical processing service are described. Finally, a description of an example computing system upon which the various components, modules, systems, devices, and/or nodes may be implemented is provided. Various examples are provided throughout the specification. A person having ordinary skill in the art should also understand that the previous and following description of a hybrid transactional and analytical processing service is a logical description and thus is not to be construed as limiting as to the implementation of the hybrid transactional and analytical processing service, or portions thereof.

FIG. 1 illustrates a service provider network that includes at least a transactional database service and an analytical database service such that clients of the service provider network may both maintain transactional data and run analytical queries against the transactional data, according to some embodiments.

In some embodiments, a hybrid transactional and analytical processing service may be implemented within a service provider network, such as service provider network 100. In some embodiments, service provider network 100 may implement various computing resources or services, such as database service(s), (e.g., relational database services, non-relational database services, a map reduce service, a data warehouse service, data storage services, such as data storage service 120 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In some embodiments, a transactional database service, such as transactional database service 110, may be configured to store and maintain tables of transactional data items for client(s) of the transactional database service. For some clients of the transactional database service, further optimization of both transactional data processing and query processing against said transactional data may be made if tables of transactional data items are replicated and maintained in an analytical database service, such as analytical database service 150. In such a manner, processing and/or computing resources of the transactional database service may remain focused on processing transactional data without interference from potentially compute-intensive analytical query processing. By "outsourcing" such analytical query requests to an analytical database service, clients of the transactional database service may obtain near real-time analytical query results from the replicated tables in the analytical database service without limiting or taking away the computing resources of the transactional database service from transactional data processing.

In order to provide both initial replicas (e.g., snapshots) of the tables to the analytical database service and subsequent updates (e.g., checkpoints, or segments/portions of a change-data-capture log) that should be applied to the snapshots in order to maintain them at the analytical database service, one or more additional services of service provider network 100 may be used as transport mechanisms for the hybrid transactional and analytical processing service. For example, a data storage service, such as data storage service 120, may be used to provide access to such snapshots and/or checkpoints for the analytical database system. In addition to (or instead of) the data storage service, a data streaming service, such as data streaming service 130 may be used to stream the snapshots and/or checkpoints to the analytical database system. A person having ordinary skill in the art should understand that additional embodiments using other transport mechanisms may similarly result in the transport of snapshots and checkpoints from the transactional database to the analytical database, and may include the use of other service(s) 140 of service provider network 100.

As shown in the figure, multiple access points (e.g., client endpoints) may be used such that clients may access the different services of service provider network 100 more directly. For example, a client of clients 170 may have accounts with at least transactional database service 110 and analytical database service 150, and may be able to access these services of service provider network 110 through network 160. In some embodiments, a same or different network connection may be used at these different access points. Network 160 may represent the same network connection or multiple different network connections, according to some embodiments. For example, network 160 may generally encompass the various telecommunications networks and service providers that collectively implement the Internet. Network 160 may also include private networks such as local area networks (LANs) or wide area networks (WANs) as well as public or private wireless networks. For example, both a given client of clients 170 and/or 180 and the various network-based services of service provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the various network-based services of service provider network 100. It is noted that in some embodiments, clients 170 and/or 180 may communicate with services of service provider network 100 using a private network rather than the public Internet. For example, clients 170, 180, and/or 190 may be provisioned within the same enterprise as various services of service provider network 100. In such a case, clients 170, 180, and/or 190 may communicate with the various services of service provider network 100 entirely through a private network 160 (e.g., a LAN or WAN that may use Internet-based communication protocols but which is not publicly accessible).

The systems described herein may, in some embodiments, implement a network-based services that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Figure 2:
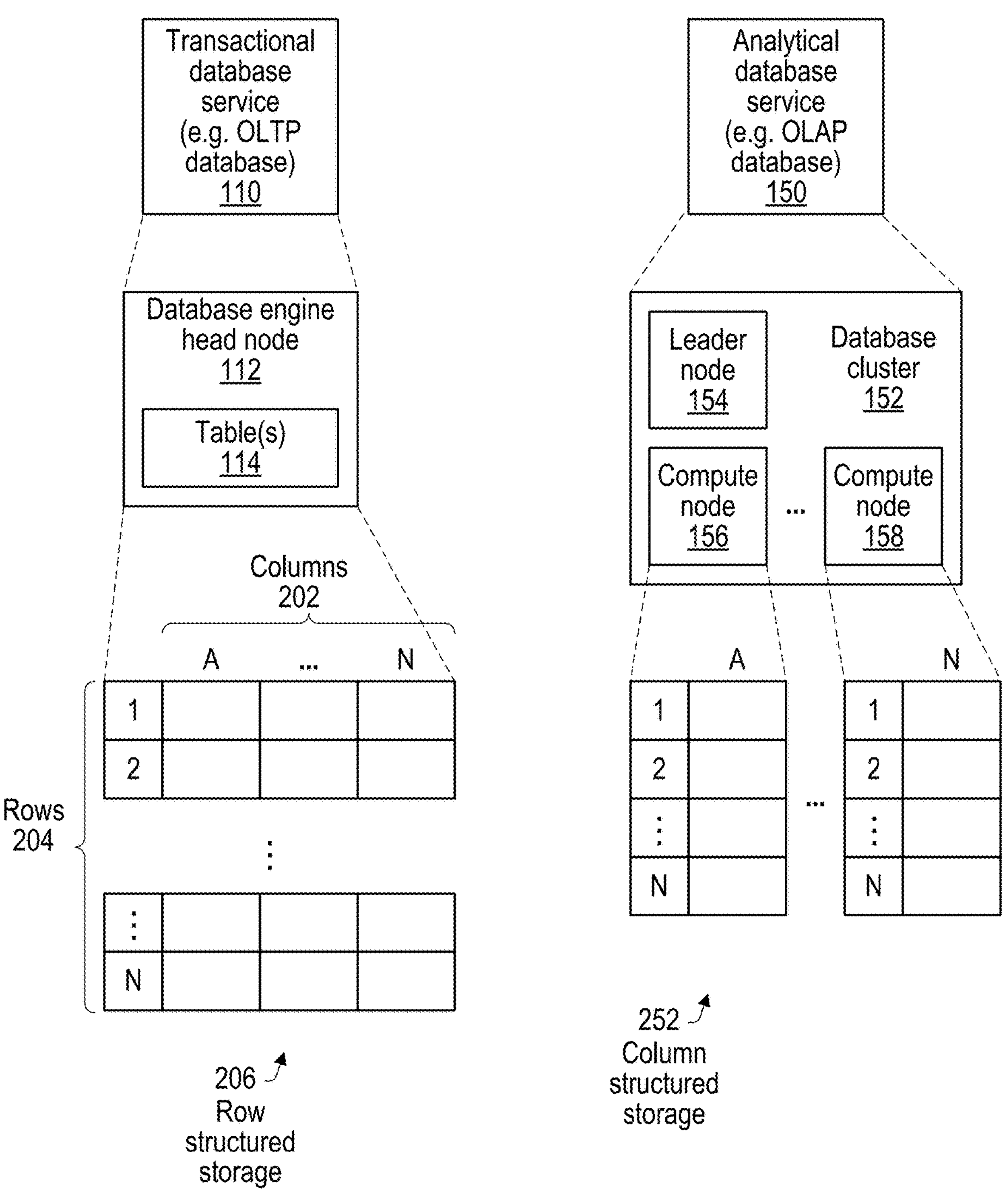
FIG. 2 illustrates a transactional database system and a corresponding row structured storage of a table in the transactional database system; and also illustrates an analytical database system storing a columnar structured representation of the table in the analytical database system, according to some embodiments.

FIG. 2 illustrates a transactional database system and a corresponding row structured storage of a table in the transactional database system; and also illustrates an analytical database system storing a columnar structured representation of the table in the analytical database system, according to some embodiments.

In some embodiments, transactional database service 110 includes database engine head node(s) 112 that store tables 114 (or table partitions). In some embodiments, the transactional formatted tables may be stored using a row-structure format, such as row structured storage 206 shown in FIG. 2. Row-structured storage may be organized such that all columns of a given row are kept together, for example managed by the same database engine head node 112. However, for large tables, the row-structured storage 206 may be partitioned such that some sets of rows are managed by more than one database engine head node 112. However, the columns of a given row are stored together.

In some embodiments, analytical database service 150 includes a database cluster 152 that includes a leader node 154 and one or more compute nodes, such as compute nodes 156 and 158. In contrast to the transactional storage (e.g. row-structured storage 206) used by the transactional database service 110, analytical database service 150 stores replicated table representations using a column structured storage 252. For example, a table may be stored using a set of data blocks, wherein each data block represents a column of the table and is stored by a given compute node, such as compute node 156 or 158. If a table is sufficiently large, a given column may be sharded such that portions of the rows of the column are stored using multiple shards. In contrast to the row-structured storage 206, the column structure storage 252 does not require all columns of a row to be stored by the same node. For example, some columns of a row may be stored as data blocks on compute node 156 while other columns of the row may be stored using separate data blocks stored on compute node 158.

Additional details regarding organization and operation of the analytical database service 150 and respective node clusters is provided in FIGS. 14A-14B, below.

Figure 3A:
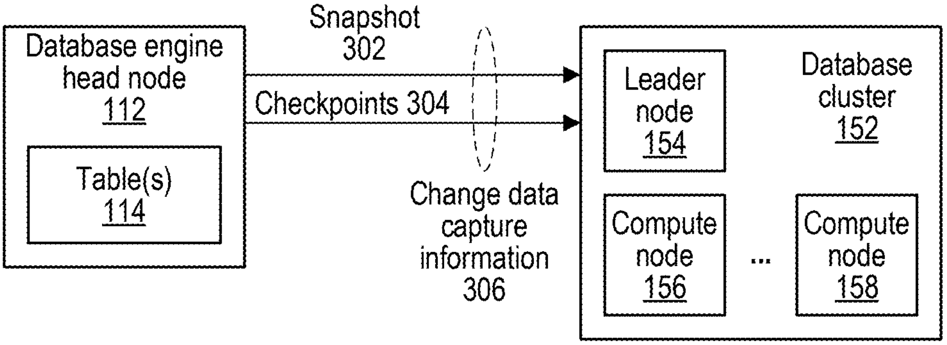
FIG. 3A illustrates change-data-capture log information being transported from a transactional database system to an analytical database system via a snapshot and subsequent checkpoints, according to some embodiments.

FIG. 3A illustrates change-data-capture log information being transported from a transactional database system to an analytical database system via a snapshot and subsequent checkpoints, according to some embodiments.

In some embodiments, database engine head node 112 generates a snapshot 302 of table 114 and provides further updates comprising changes applied to table 114 via checkpoints 304. Each of the checkpoints may include change-data-capture information 306 that is used by database cluster 152 to maintain a near real-time table representation 314 of table 114 in the analytical database service 150. As an example, in some embodiments the generated checkpoints, such as checkpoints 304A-304N may be stored in storage accessible by the database cluster 152. In some embodiments, leader node 154 polls the storage location, such as an object-based storage service, to determine if new checkpoints are available to be applied. Also, a poll response 312 is received by the leader node 154 indicating whether there are any checkpoints to be applied.

Figure 3B:
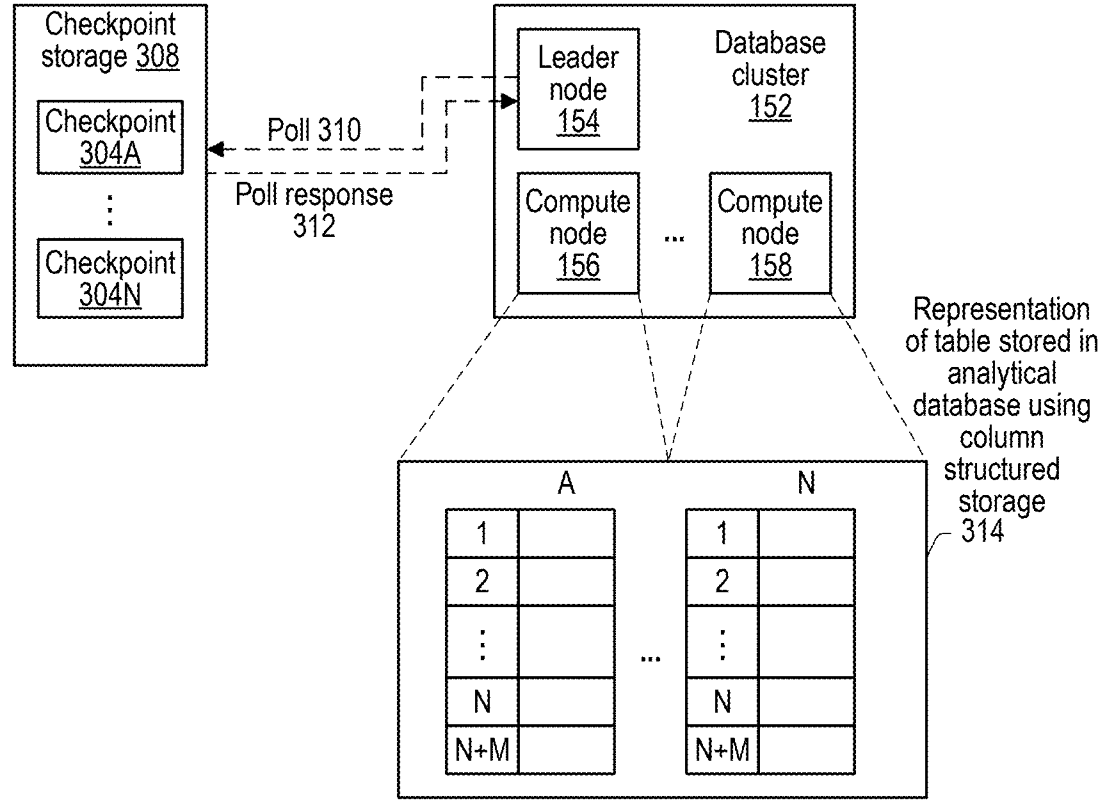
FIG. 3B illustrates the change data capture log information being added to the table representation of the analytical database system, according to some embodiments.

FIG. 3B illustrates the change data capture log information being added the table representation of the analytical database, according to some embodiments.

For example, FIG. 3B illustrates addition row (N+M) being added to table representation 314 in response to applying change-data-capture information included in a checkpoint 304. Also, values stored for existing rows 1-N may also be changed when applying a checkpoint. As further explained in FIGS. 4-13, in some embodiments, when an entry of an existing row is changed due to application of the checkpoint, a historical version of the row may be retained (without the checkpoint change applied) and a new version of the row may be added and marked as the active version, wherein the checkpoint change is applied in the newer version of the row. Thus, in some embodiments a plurality of version of a same row may be maintained in the analytical database, wherein each version corresponds to a state of the table prior to application of a transaction that changed the respective row.

Figure 4A:
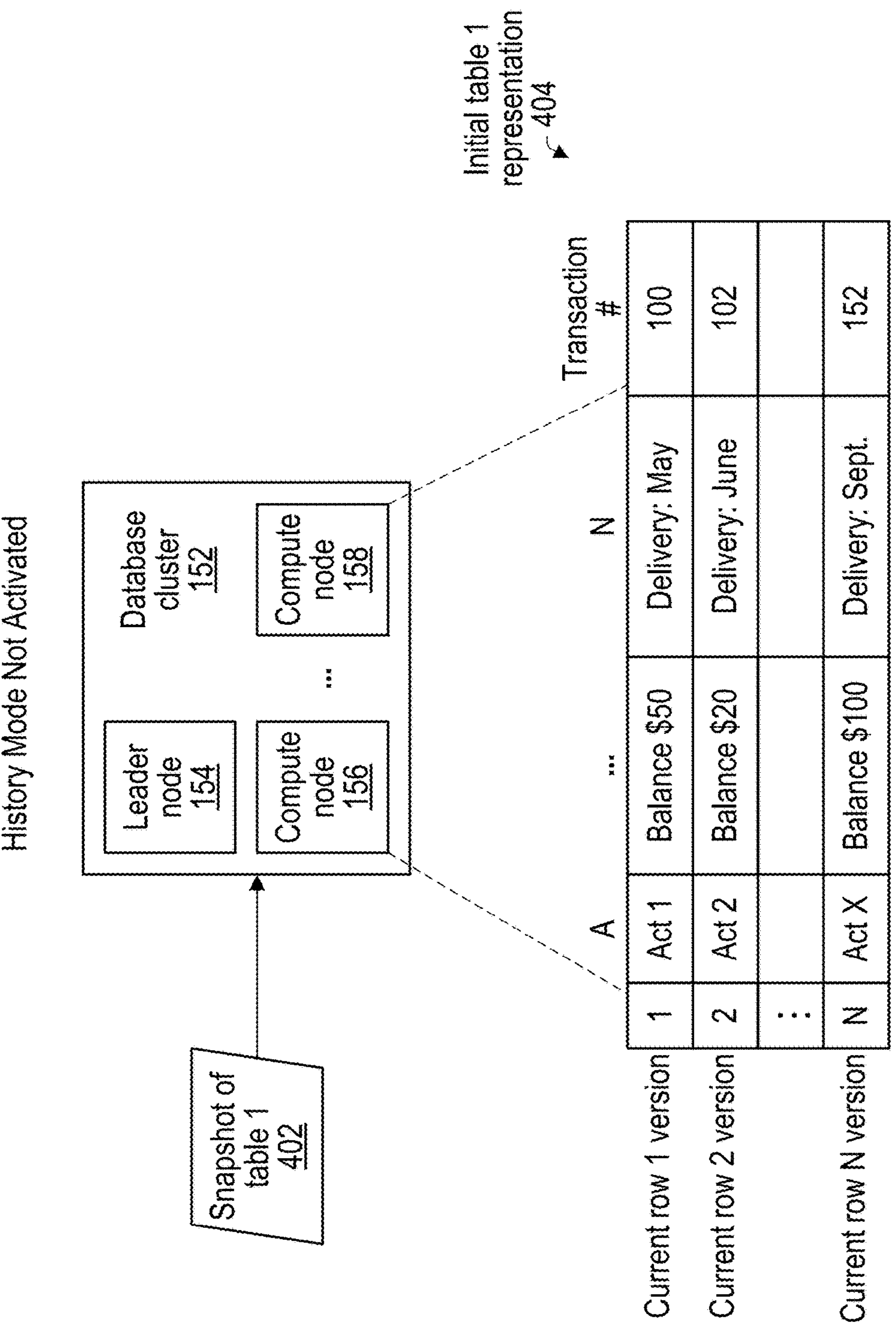
FIG. 4A illustrates an example representation of a table that is initiated in an analytical database system using a snapshot of a transactional database received from a transactional database system, wherein a history mode of the analytical database system is not yet activated, according to some embodiments.

For example, FIG. 4A illustrates an example representation of a table that is initiated in an analytical database system using a snapshot of a transactional database received from a transactional database system, wherein a history mode of the analytical database system is not yet activated, according to some embodiments.

Compute nodes 156 and 158 store data blocks that represent columns of a table, for example, compute nodes 156 and 158 store initial table 1 representation 404 which may have been created from snapshot 402 of table 1 that is maintained by a transactional database system. For example, table 1 may be one of the tables 114 that is maintained by database engine head node 112 of transactional database service 110. As an example, table 1 and the initial representation 404 of table 1 may include 1 to N rows, with multiple columns per row, such as columns for "account", "balance", and "delivery status" as shown in the example illustrated in FIG. 4A. Also, each row may have an associated transaction number representing when the row was added as a transaction to the transactional database system. In some embodiments, a transaction number may be represented using a time stamp, logical sequence number (LSN), etc.

Figure 4B:
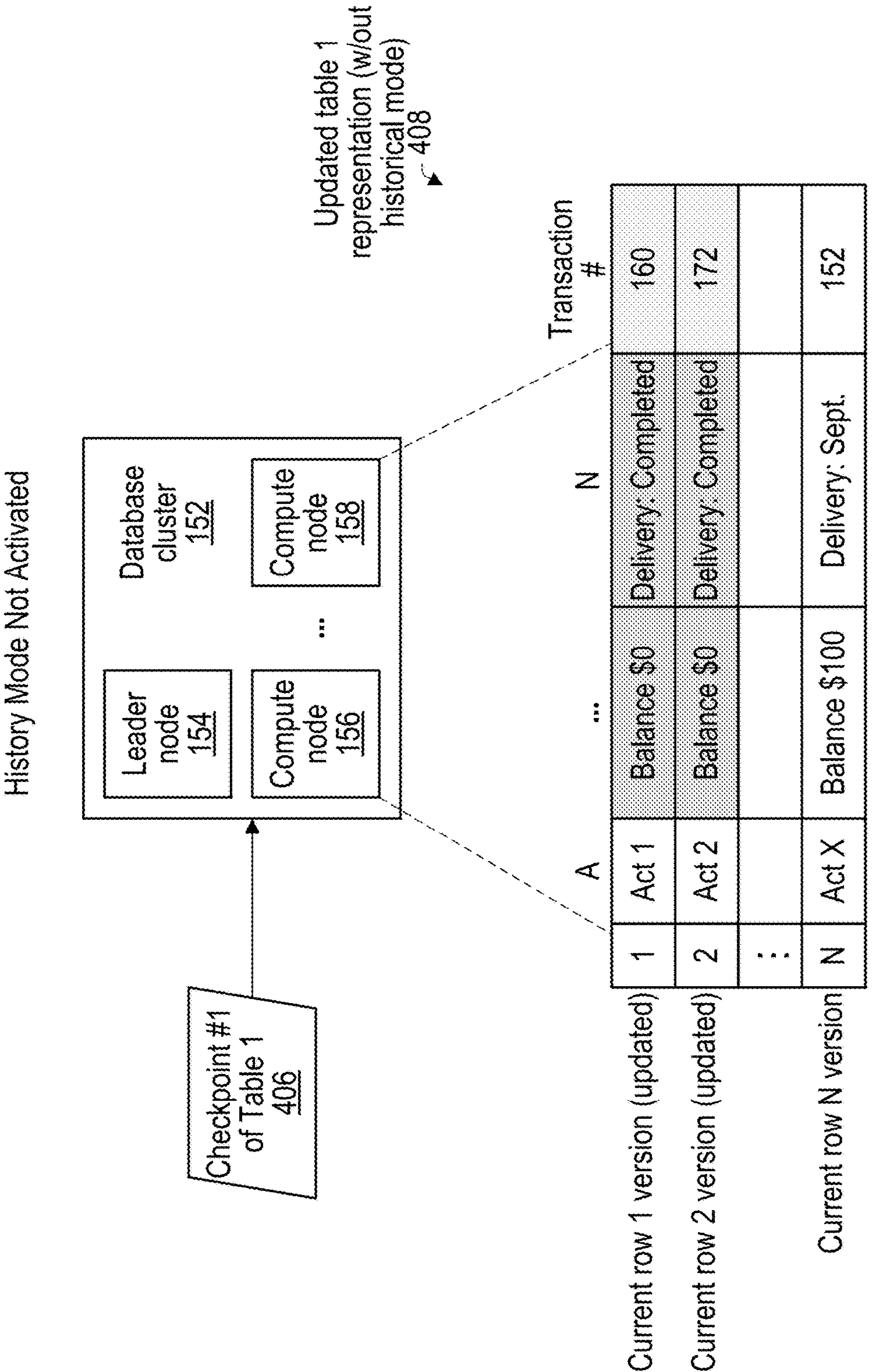
FIG. 4B illustrates the example representation of the table being updated based on change-data-capture log information included in a checkpoint transported from the transactional database system to the analytical database system, according to some embodiments.

FIG. 4B illustrates the example representation of the table being updated based on change-data-capture log information included in a checkpoint transported from the transactional database system to the analytical database system, according to some embodiments.

As shown in FIG. 4B, subsequent to initializing the table 1 representation in the analytical database service 150 using snapshot 402, a subsequent checkpoint 404 may be received that includes change-data-capture information for changes made to table 1 in the transactional database service 110. For example, database engine head node 112 of transactional database service 110 may generate checkpoint 406. When historical mode is not activated, changes indicated in the checkpoint 406 may be applied to the table 1 representation 408, for example by overwriting prior values of the respective rows. For example, FIG. 4B shows delivery status being updated to "completed" for rows 1 and 2 as well as the balances being updated to a zero balance based on change-data-capture information included in checkpoint 406. Also, the transaction numbers associated with the respective rows has been updated to reflect the latest transactions applied to the respective rows.

Figure 5A:
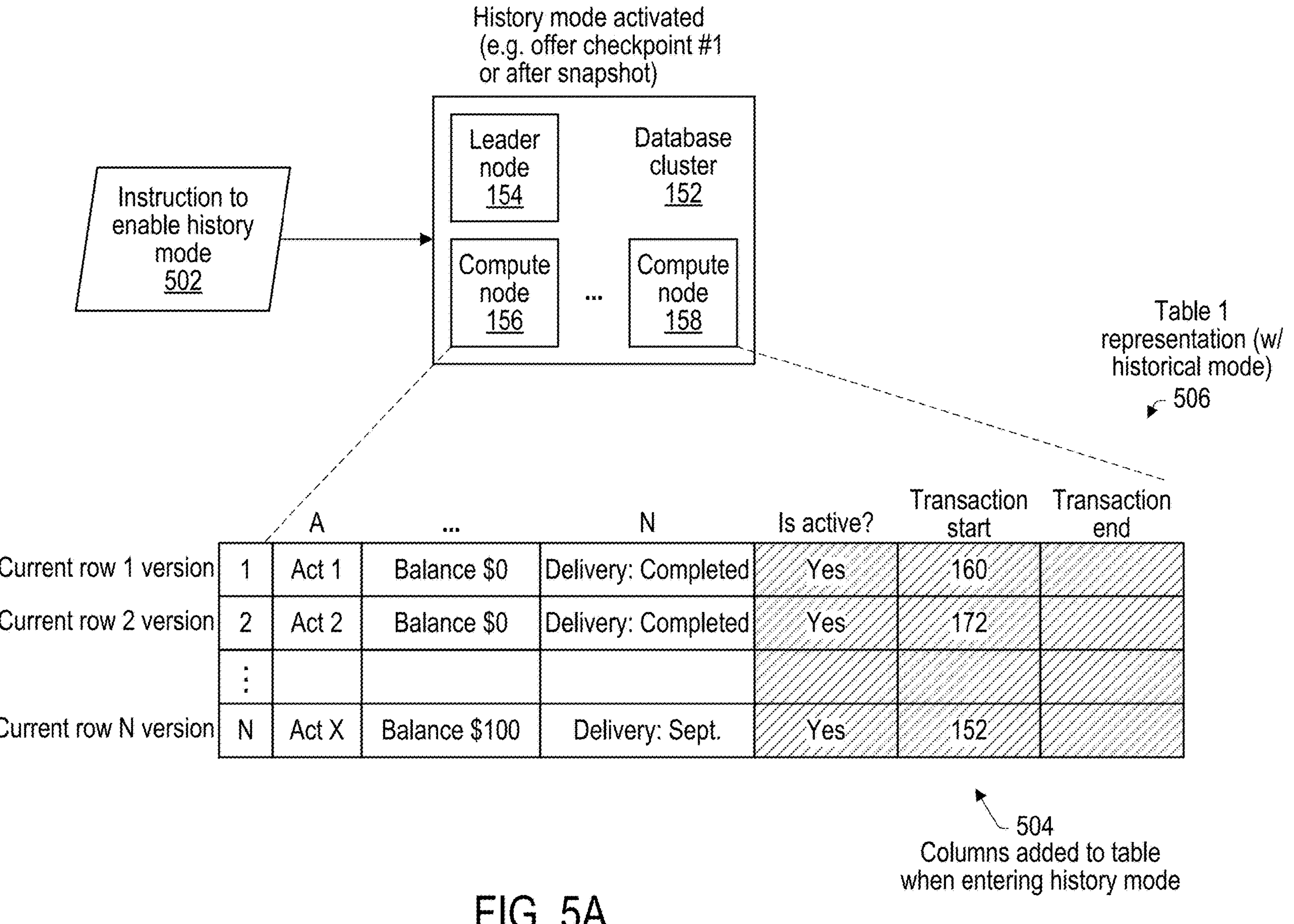
FIG. 5A illustrates changes to the example representation of the table in response to history mode being activated, wherein additional columns indicating an active/inactive status of each row as well as transaction numbers when the respective rows became active and ended being active are added, according to some embodiments.

FIG. 5A illustrates changes to the example representation of the table in response to history mode being activated, wherein additional columns indicating an active/inactive status of each row as well as transaction numbers when the respective rows became active and ended being active are added, according to some embodiments.

An existing table of an analytical database, such as the table representation 1 may be seamlessly transitioned into historical mode. For example, an instruction 502 may be received to transition table representation 408 into historical mode. In response to receiving the instruction to enter historical mode, the analytical database system may add additional columns 504 to the table representation, such as shown for table 1 representation in historical mode 506. For example, the columns "_is_active, is_start_time, is_delete_time" have been added. Note that the current latest transaction number for the respective rows may be adopted as the transaction start number when entering historical mode. Subsequent rows added while in history mode may be assigned a transaction start number that corresponds to a current transaction number of a transaction at the transactional database that added the respective rows (while history mode is active). When a row is changed to an inactive status, for example due to a "soft-delete" the transaction number of the transaction (performed at the transactional database) that caused the soft-delete may be used as the transaction end number for that respective row.

Figure 5B:
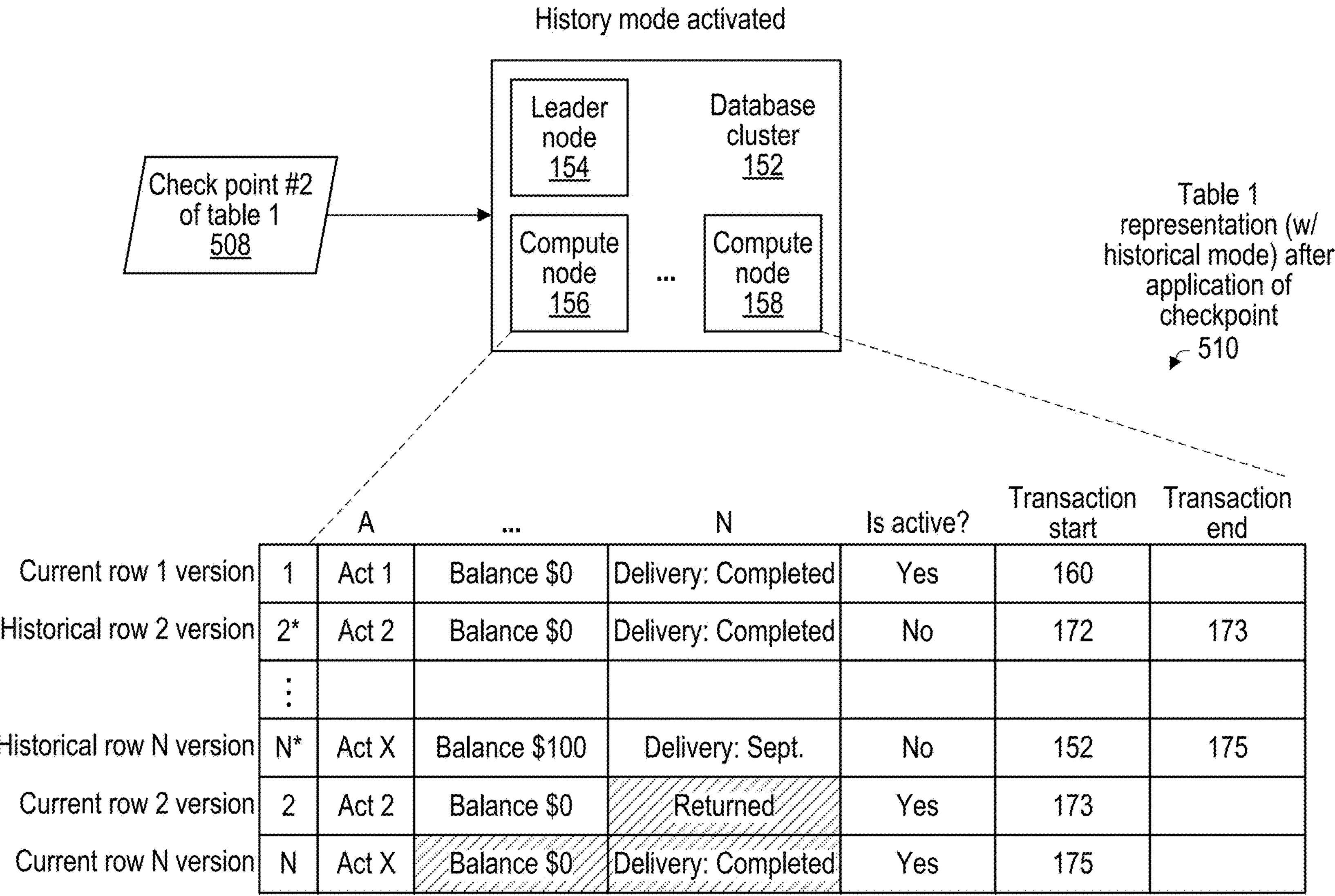
FIG. 5B illustrates the example representation of the table being further updated, with history mode active, based on change-data-capture log information included in a checkpoint transported from the transactional database system to the analytical database system, according to some embodiments.

FIG. 5B illustrates the example representation of the table being further updated, with history mode active, based on change-data-capture log information included in a checkpoint transported from the transactional database system to the analytical database system, according to some embodiments.

While in history mode, a further checkpoint 508 may be received. For example, checkpoint 508 may include change-data-capture information indicating that transaction 173 changed the delivery status of row 2 from "completed" to "returned." Also, checkpoint 508 may include change-data-capture information indicating that transaction 175 changed the balance and delivery status of row N to "$0" and "completed", respectively. However, in contrast to what is shown in FIG. 4B, when historical mode was off, in FIG. 5B, wherein historical mode is active, a historical version (2*) of row 2 is retained. Likewise, a historical version (N*) of row N is retained. Note that both historical versions of the rows (e.g., 2* and N*) are marked as inactive (e.g. is active?=No). Also, the transaction end time has been updated to reflect the respective transactions, e.g. 173 and 175, that caused the historical rows (e.g., 2* and N*) to become inactive. Also, new rows representing the current state of row 2 and row N are added and have respective transaction start times corresponding to the transactions that made the rows active, e.g. transactions 173 and 175, respectively. This is shown in table 1 representation 510 with historical mode active subsequent to applying checkpoint 508, as illustrated in FIG. 5B.

Figure 6:
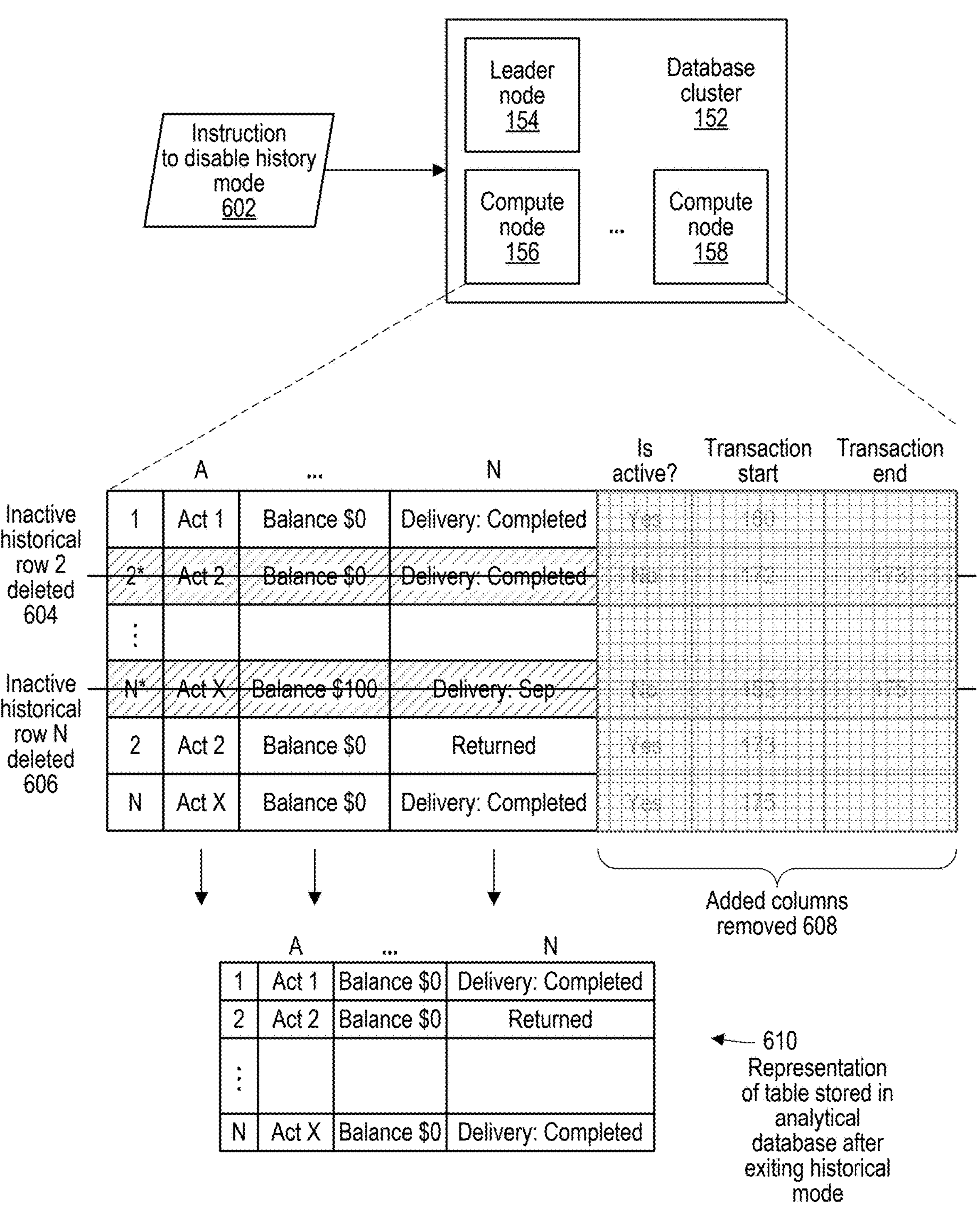
FIG. 6 illustrates changes to the example representation of the table in response to history mode being de-activated, wherein inactive versions of rows are deleted and the additional columns added when entering history mode are removed, according to some embodiments.

FIG. 6 illustrates changes to the example representation of the table in response to history mode being de-activated, wherein inactive versions of rows are deleted and the additional columns added when entering history mode are removed, according to some embodiments.

For example, database cluster 152 may receive instruction 602 to disable historical mode. In response, inactive historical row 2 (604) and inactive historical row N (606) are deleted. Also, the columns added when entering historical mode are removed (608). The table representation is then seamlessly converted back to representation 610 with historical mode disabled.

Figure 7:
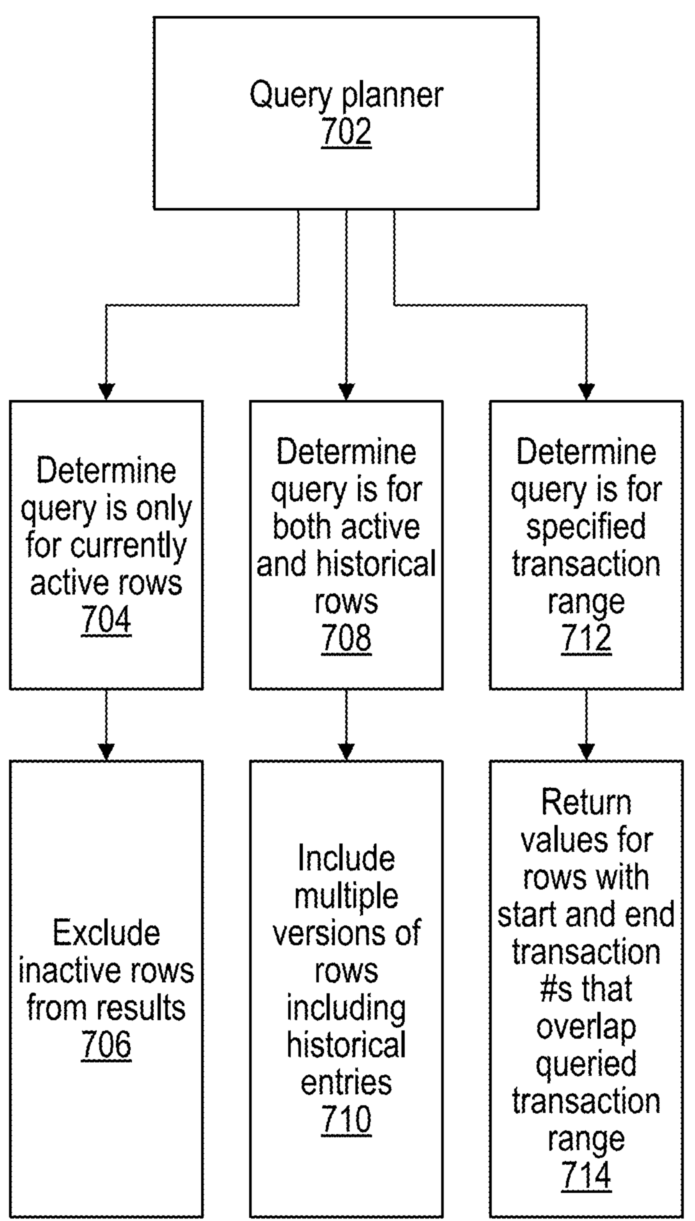
FIG. 7 illustrates query planning options for different types of queries that target only current versions of the table data, only historical versions of the table data, or a mix of current and historical versions of the table data, according to some embodiments.

FIG. 7 illustrates query planning options for different types of queries that target only current versions of the table data, only historical versions of the table data, or a mix of current and historical versions of the table data, according to some embodiments.

In some embodiments, leader node 154 includes a query planner, such as query planner 702. The query planner 702 uses the added columns "_is_active, is_start_time, is_delete_time" in order to make query plans when historical mode is activated. For example, at 704 the query planner determines if the query is only for active rows. If so at 706 the query planner either excludes inactive rows and/or filters for active rows when making a query plan. At 708, the query planner determines whether the query is for active and inactive rows, in which case at 710 the query planner includes multiple versions of rows in a query plan. For example, the query planner may remove the filter to query only active rows. In some embodiments, transaction number ranges may be specified in a mixed query that includes both active and inactive row data, wherein the specified transaction number range limit how much historical row data is to be included in the query. At 712, the query planner determines if the query is for a specified transaction range, in which case at 714, the query planner limits the query to rows that have associated active transaction ranges (e.g. between row active transaction number and row inactive transaction number) that overlap with the specified transaction range to be used for the query. In some embodiments, a query may additionally specify only historical row data is to be queried, in which case the query planner may exclude rows that are marked as active.

Figure 8:
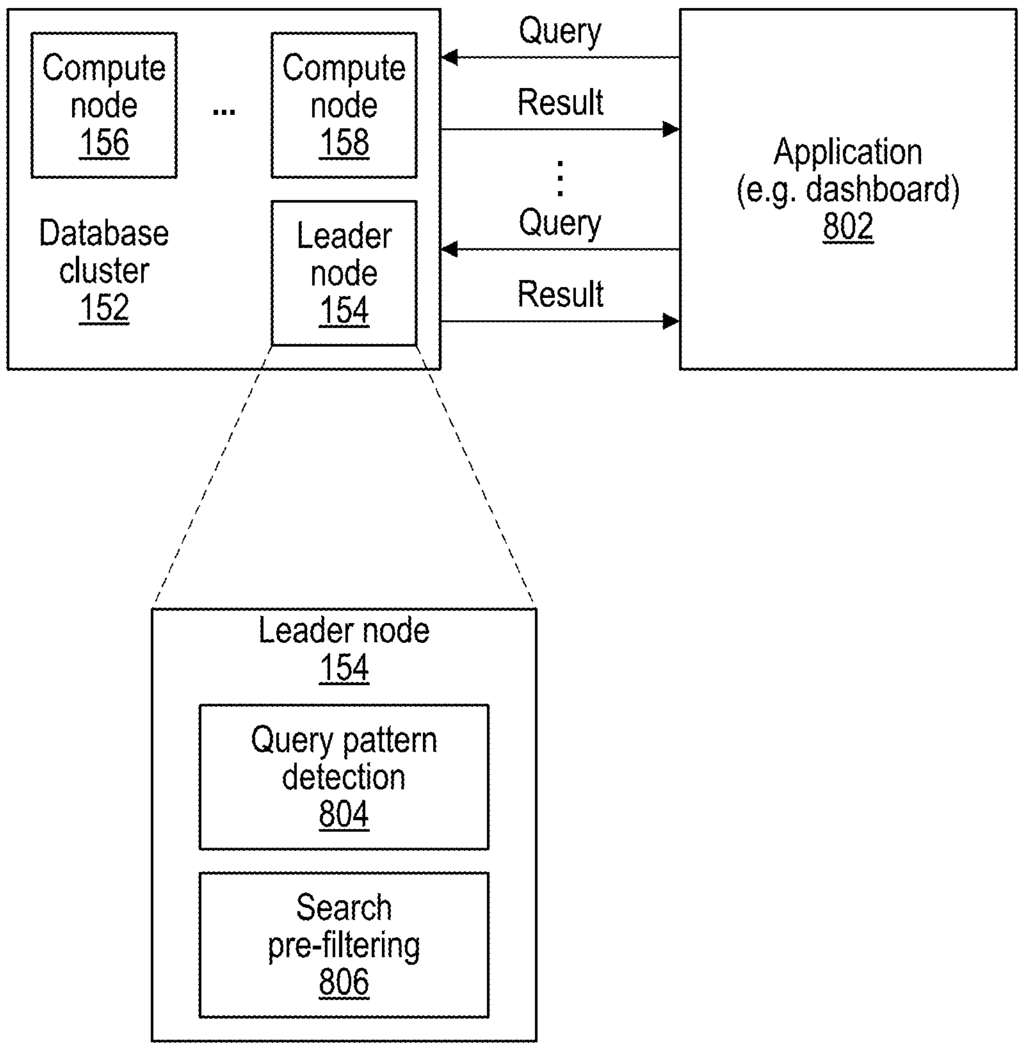
FIG. 8 illustrates a leader node learning a query pattern for an application that regularly queries the table representation in the analytical database, wherein the leader node performs search pre-filtering based on the detected query pattern, according to some embodiments.

FIG. 8 illustrates a leader node learning a query pattern for an application that regularly queries the table representation in the analytical database, wherein the leader node performs search pre-filtering based on the detected query pattern, according to some embodiments.

In some embodiments, an application 802, such as a customer dashboard, may make repeated queries to the analytical database node cluster 152. For example, the dashboard may update hourly, every minute, etc. In such cases, leader node 154 may determine a query pattern for the application using query pattern detection 804 and perform pre-filtering 806 in order to anticipate the application query and more quickly provide a query result.

Figure 9:
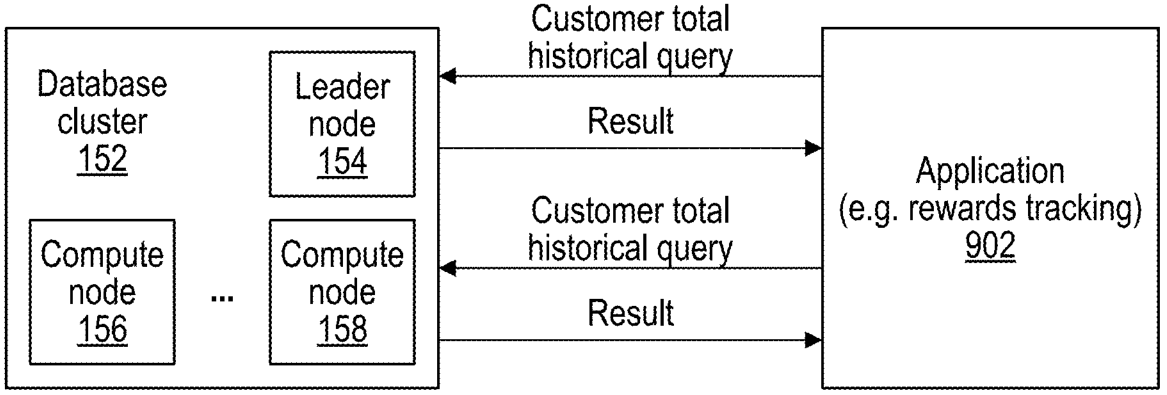
FIG. 9 illustrates an example interaction wherein an application performs historical queries against a representation of a table maintained in the analytical database with history mode enabled, according to some embodiments.

FIG. 9 illustrates an example interaction wherein an application performs historical queries against a representation of a table maintained in the analytical database with history mode enabled, according to some embodiments.

In some embodiments, a customer application 902, such as an awards tracking application, may make use of historical row data in order to determine a cumulative query amount. Also, in some embodiments, application 902 may specify parameters of the additionally added rows ("_is_active, is_start_time, is_delete_time) in order to more fine tune a query, such as for historical information.

Figure 10:
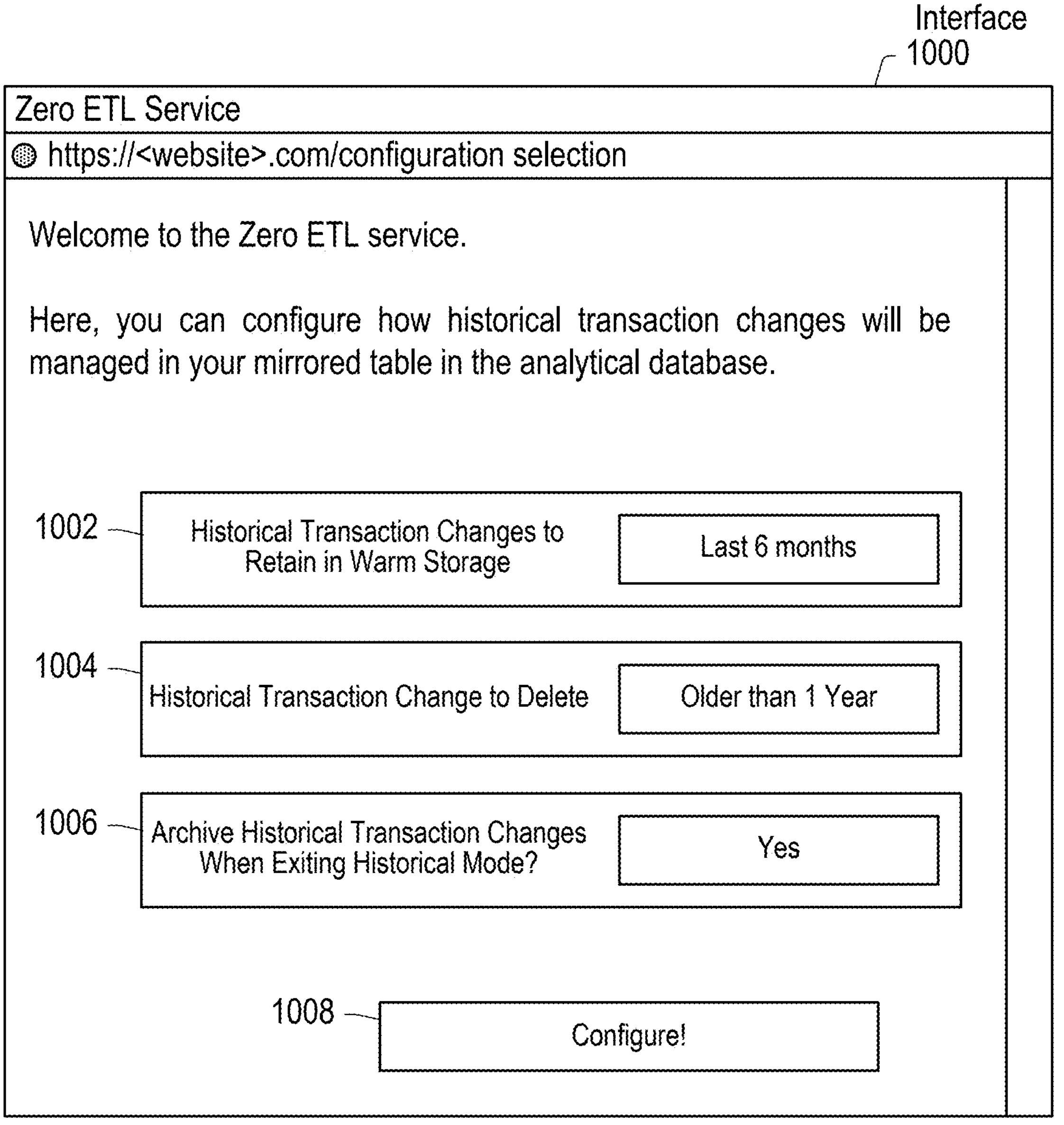
FIG. 10 illustrates an example user interface that may be used to configure history mode for an analytical database that maintains a representation of a table of a transactional database, wherein change-data-capture information is transported from the transactional database to the analytical database, according to some embodiments.

FIG. 10 illustrates an example user interface that may be used to configure history mode for an analytical database that maintains a representation of a table of a transactional database, wherein change-data-capture information is transported from the transactional database to the analytical database, according to some embodiments.

In some embodiments, historical row data may be maintained in different ways by an analytical database. For example, historical rows with an age greater than a threshold may be moved to cold storage. Also, in some embodiments, historical rows that are older than another threshold may be deleted. In some embodiments, such configurations are customizable by a customer.

For example, FIG. 10 illustrates interface 1000 that may be used by a customer to specify storage configurations for historical row data. For example, in box 1002 a customer may specify a threshold for moving historical row data out of warm storage. Also, at box 1004, a customer may specify a threshold for deleting aged historical row data.

In some embodiments, instead of deleting historical row data when exiting historical mode, the historical row data can instead be retained, such as in an unstructured data item associated with a given table. For example, in box 1006, a customer may specify that historical transaction changes are to be archived when exiting historical mode.

Using box 1008 a customer may confirm the selected configurations are to be implemented.

Figure 11:
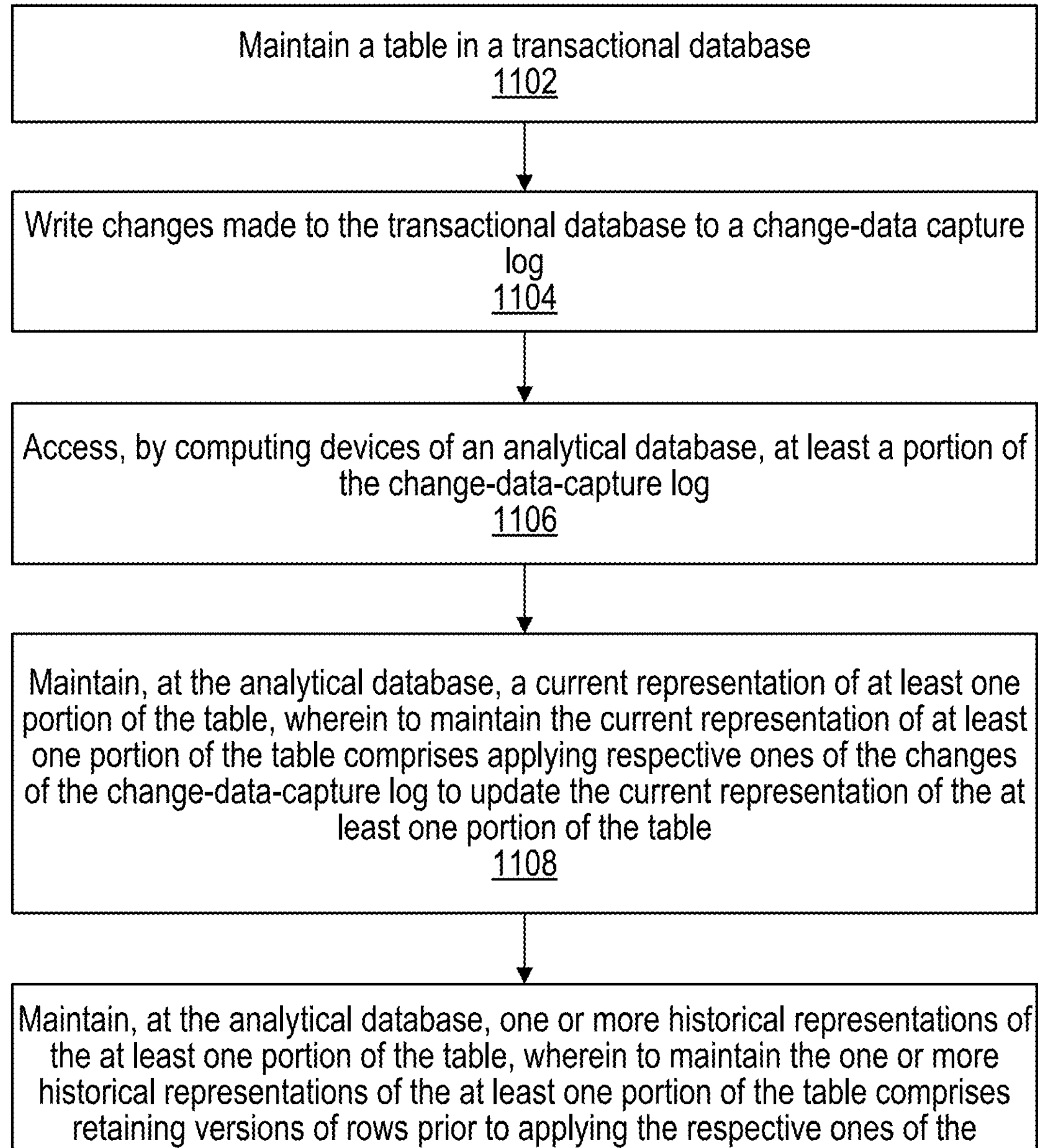
FIG. 11 is a flowchart illustrating a process of maintaining both a current and one or more historical representations of a transactional table in an analytical database, according to some embodiments.

FIG. 11 is a flowchart illustrating a process of maintaining both a current and one or more historical representations of a transactional table in an analytical database, according to some embodiments.

At block 1102, a transactional database (e.g., OLTP database) maintains a transactional table. Also, at block 1104, the transactional database writes changes made to the transactional table to a change-data-capture log. At block 1106, the change-data-capture log is made available to an analytical database (e.g., OLAP database). For example, a storage service or streaming service, etc. may have been used to transport the change-data-capture information to the analytical database as a checkpoint file.

At block 1108, the analytical database maintains a current representation of at least one portion of the table, wherein to maintain the current representation of at least one portion of the table comprises applying respective ones of the changes of the change-data-capture log to update the current representation of the at least one portion of the table.

Also, at block 1110, the analytical database maintains one or more historical representations of the at least one portion of the table, wherein to maintain the one or more historical representations of the at least one portion of the table comprises retaining versions of rows prior to applying the respective ones of the transactional changes, wherein the versions retained prior to applying the respective ones of the transactional changes are marked as inactive rows of the at least one portion of the table maintained at the analytical database.

FIG. 12 is a flowchart illustrating a process of transitioning an existing table in an analytical base into a history mode, according to some embodiments.

At block 1202, an analytical database receives a request to transition from maintaining the representation of the at least one portion of the table with historical mode disabled to maintaining the representation of the at least one portion of the table with historical mode enabled. In response, at block 1204, the analytical database modifies the representation of the at least one portion of the table to include additional columns indicating (1) whether the respective rows are active or inactive; (2) transaction numbers at which the respective rows become active; and (3) for inactive rows, transaction numbers at which the respective rows became inactive.

FIG. 13 is a flowchart illustrating a process of exiting history mode for a table of an analytical database, according to some embodiments.

At block 1302, an analytical database receives a request to transition from maintaining the representation of the at least one portion of the table with historical mode enabled to maintaining the representation of the at least one portion of the table with historical mode disabled. In response, at block 1304, the analytical database modifies the representation of the at least one portion of the table by deleting rows marked as inactive and deleting the additional columns.

Figure 14A:
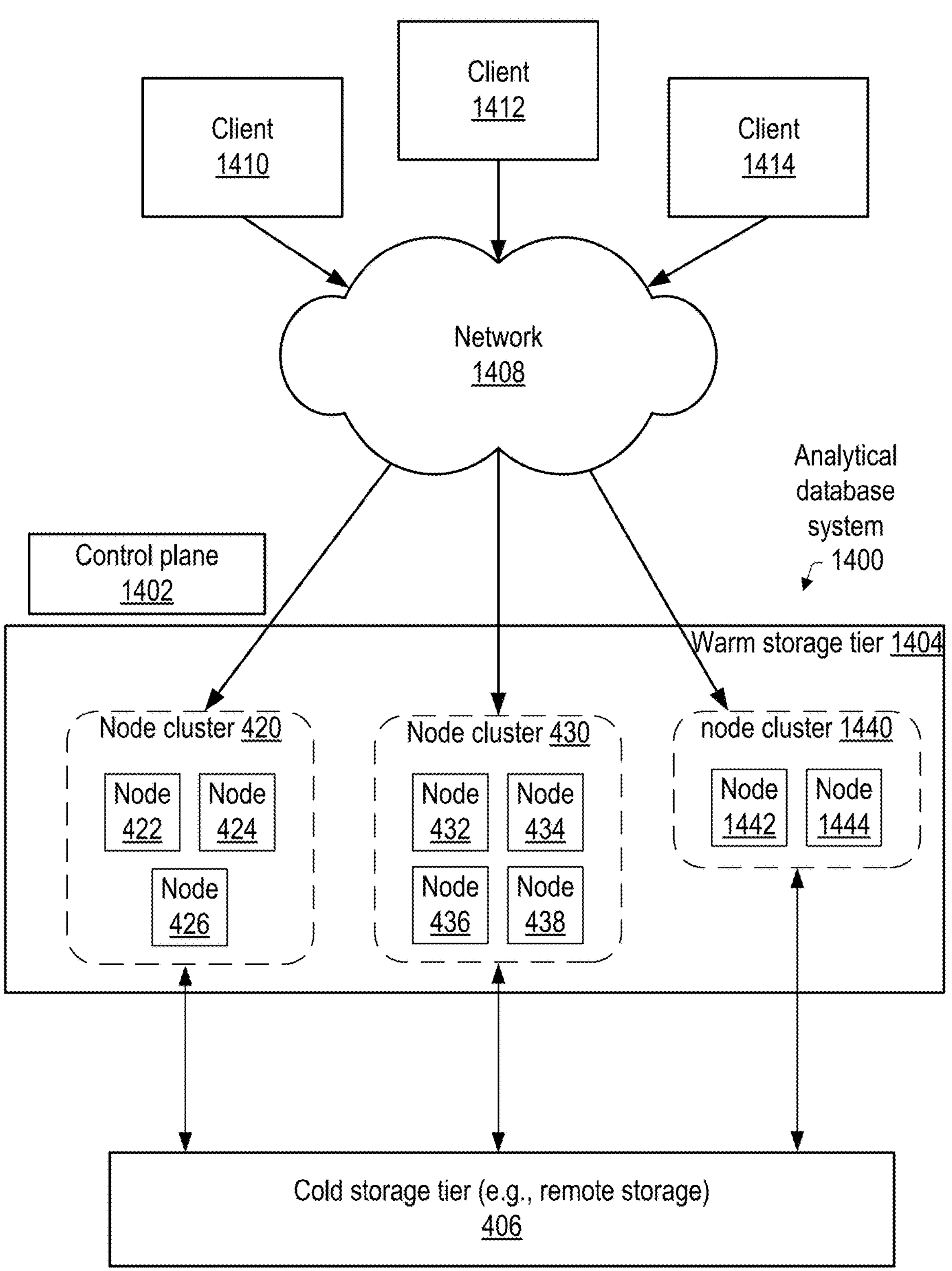
FIG. 14A illustrates various components of an analytical database system configured to use warm and cold storage tiers to store data blocks for clients of an analytical database service, wherein the warm storage tier comprises one or more node clusters associated with said clients, according to some embodiments.

FIG. 14A illustrates various components of an analytical database system configured to use warm and cold storage tiers to store data blocks for clients of an analytical database service, wherein the warm storage tier comprises one or more node clusters associated with said clients, according to some embodiments.

Figure 14B:
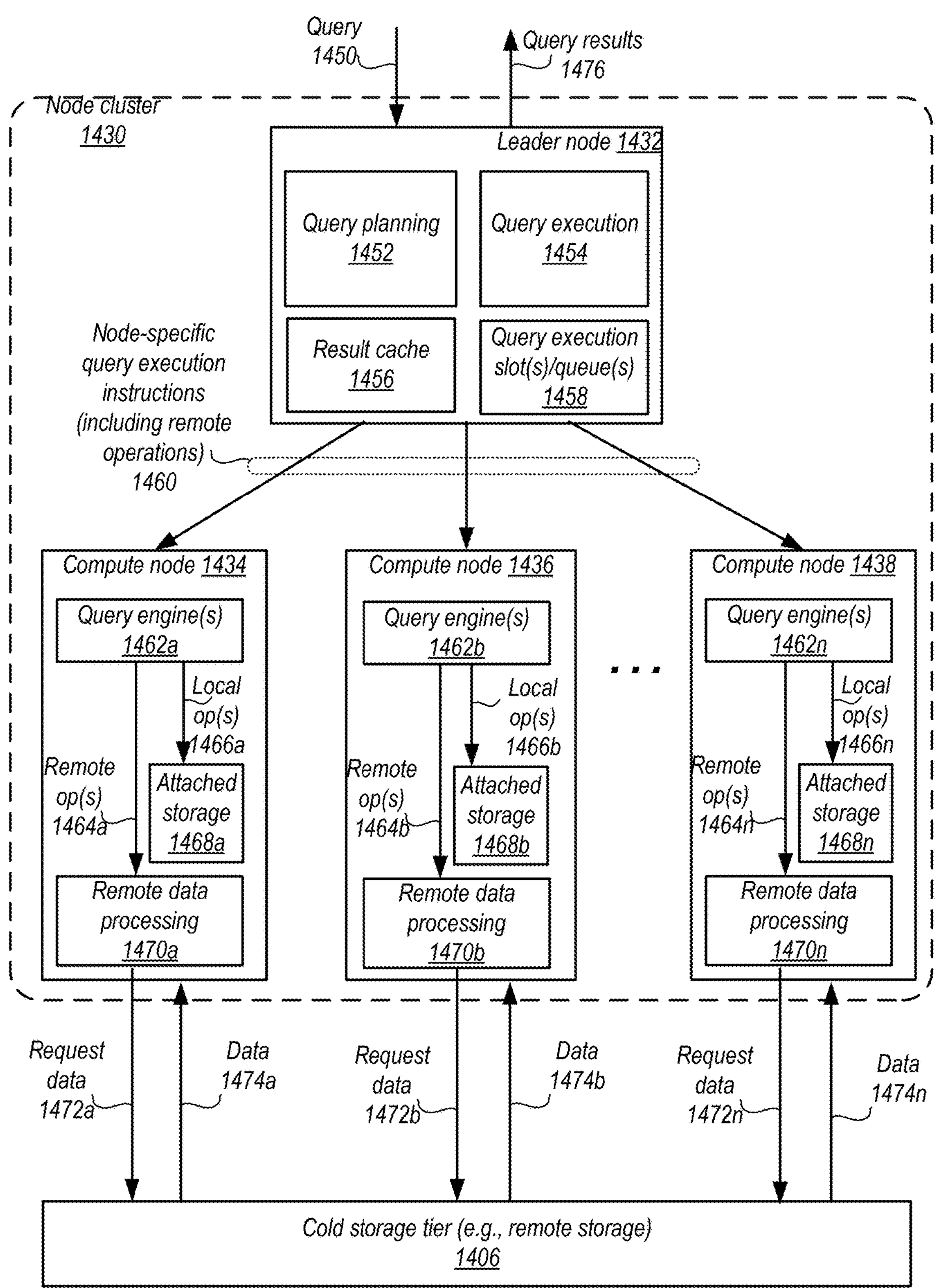
FIG. 14B illustrates an example of a node cluster of an analytical database system performing queries against transactional database data, according to some embodiments.

In various embodiments, the components illustrated in at least FIGS. 14A and 14B may be implemented directly within computer hardware, as instructions directly or indirectly executable by computer hardware (e.g., a microprocessor or computer system), or using a combination of these techniques. For example, the components of shown in FIGS. 14A and 14B may be implemented by a system that includes a number of computing nodes (or simply, nodes), each of which may be similar to the computer system embodiment illustrated in FIG. 18 and described below. In various embodiments, the functionality of a given system or service component (e.g., a component of analytical database system 1400) may be implemented by a particular node or may be distributed across several nodes. In some embodiments, a given node may implement the functionality of more than one service system component (e.g., more than one data store component).

Analytical database service 150 may be various types of data processing services that perform general or specialized data processing functions (e.g., querying transactional data tables, anomaly detection, machine learning, data mining, big data querying, or any other type of data processing operation). For example, analytical database service 150 may include various types of database services (both relational and non-relational) for storing, querying, updating, and maintaining data such as transactional data tables. Such services may be enterprise-class database systems that are highly scalable and extensible. Queries may be directed to a database in analytical database service 150 that is distributed across multiple physical resources, and the analytical database system may be scaled up or down on an as needed basis.

Analytical database service 150 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, analytical database service 150 may implement, in some embodiments, a data warehouse service, that utilizes one or more of the additional services of service provider network 100, to execute portions of queries or other access requests with respect to data that is stored in a remote data store, such as cold storage tier 1406 (or another data store within data storage services 120, etc.) to implement query processing for distributed data sets.

In at least some embodiments, analytical database service 150 may be a data warehouse service. Thus, in the description that follows, analytical database service 150 may be discussed according to the various features or components that may be implemented as part of a data warehouse service, including a control plane, such as control plane 1402, and processing node clusters 1420, 1430, and 1440. Note that such features or components may also be implemented in a similar fashion for other types of data processing services and thus the following examples may be applicable to other types of data processing services, such as database services. Analytical database service 150 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where analytical database service 150 is a data warehouse service, the data warehouse service may offer clients a variety of different data management services, according to their various needs. In some cases, clients may wish to store and maintain large amounts of data, such as transactional records, website analytics and metrics, sales records marketing, management reporting, business process management, budget forecasting, financial reporting, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Figure 18:
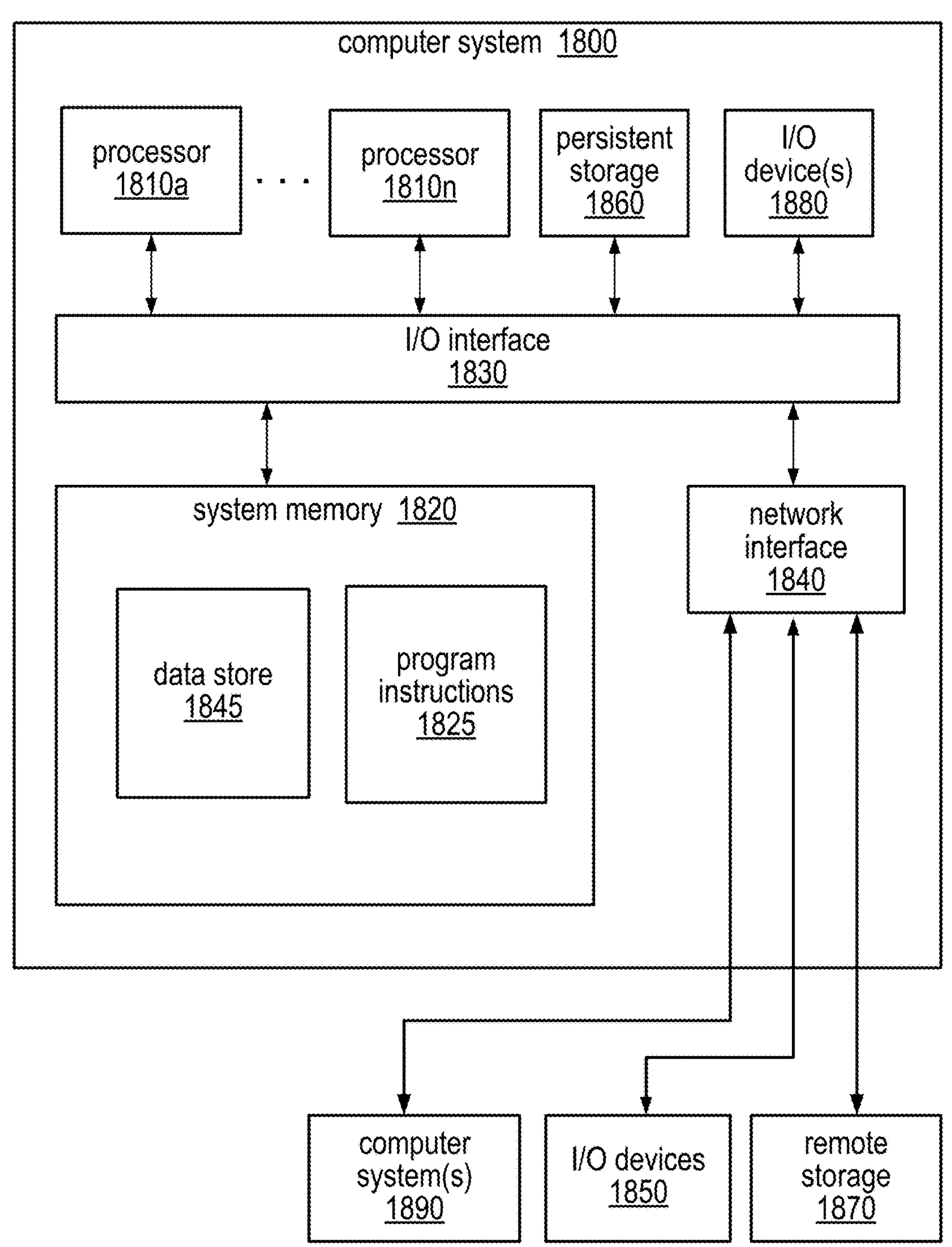
FIG. 18 is a block diagram illustrating an example computing device that may be used in at least some embodiments.

Analytical database system 1400 may be implemented by a large collection of computing devices, such as customized or off-the-shelf computing systems, servers, or any other combination of computing systems or devices, such as the various types of systems 1400 described below with regard to FIG. 18. Different subsets of these computing devices may be controlled by a control plane of the analytical database system 1400. Control plane 1402, for example, may provide a cluster control interface to clients or users who wish to interact with the processing clusters, such as node cluster(s) 1420, 1430, and 1440 managed by control plane 1402. For example, control plane 1402 may generate one or more graphical user interfaces (GUIs) for clients, which may then be utilized to select various control functions offered by the control interface for the processing clusters 1420, 1430, and 1440 hosted in the analytical data processing service 150. Control plane 1402 may provide or implement access to various metrics collected for the performance of different features of analytical database service 150, including processing cluster performance, in some embodiments.

As discussed above, various clients (or customers, organizations, entities, or users) may wish to store and manage data using an analytical database service 150. Processing clusters 1420, 1430, and 1440 may respond to various requests, including write/update/store requests (e.g., to write data into storage) or queries for data (e.g., such as a Server Query Language request (SQL) for particular data). For example, multiple users or clients may access a processing cluster to obtain data warehouse services.

Processing clusters, such as node clusters 1420, 1430, and 1440, hosted by analytical database service 150 may provide an enterprise-class database query and management system that allows users to send data processing requests to be executed by the clusters, such as by sending a query. Processing clusters 1420, 1430, and 1440 may perform data processing operations with respect to data stored locally in a processing cluster, as well as remotely stored data. For example, cold storage tier 1406 may comprise backups or other data of a database stored in a cluster. In some embodiments, database data may not be stored locally in a processing cluster 1420, 1430, or 1440 but instead may be stored in cold storage tier 1406 (e.g., with data being partially or temporarily stored in processing cluster 1420, 1430, or 1440 to perform queries). Queries sent to a processing cluster 1420, 1430, or 1440 (or routed/redirect/assigned/allocated to processing cluster(s)) may be directed to local data stored in the processing cluster and/or remote data. Therefore, processing clusters may implement local data processing, such as local data processing, to plan and execute the performance of queries with respect to local data in the processing cluster, as well as a remote data processing client.

Analytical database system 1400 of analytical database service 150 may implement different types or configurations of processing clusters. For example, different configurations 1420, 1430, or 1440, may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations of processing cluster 1420, 1430, 1440, etc. may offer different execution times. As shown in FIG. 14A, node cluster 1420 comprises nodes 1422, 1424, and 1426, node cluster 1430 comprises nodes 1432, 1434, 1436, and 1438, and node cluster 1440 comprises node 1442 and 1444. Different configurations of processing clusters may be maintained in different pools of available processing clusters to be attached to a database. Attached processing clusters may then be made exclusively assigned or allocated for the use of performing queries to the attached database, in some embodiments. The number of processing clusters attached to a database may change over time according to the selection techniques discussed below.

In some embodiments, analytical database service 150 may have at least one processing cluster attached to a database, which may be the "primary cluster." Primary clusters may be reserved, allocated, permanent, or otherwise dedicated processing resources that store and/or provide access to a database for a client, in some embodiments. Primary clusters, however, may be changed. For example, a different processing cluster may be attached to a database and then designated as the primary database (e.g., allowing an old primary cluster to still be used as a "secondary" processing cluster or released to a pool of processing clusters made available to be attached to a different database). Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary cluster. Control plane 1402 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored in cold storage tier 1406, according to some embodiments. For example, a leader node, or other processing cluster component, may implement a backup agent or system that creates and store database backups for a database to be stored as database data in cold storage tier 1406 and/or data storage service 120. Database data may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data may be maintained in some embodiments, so that the latest database data may, for instance, be obtained by a processing cluster in order to perform queries. In at least some embodiments, database data (e.g., cold storage tier 1406 data) may be treated as the authoritative version of data, and data stored in processing clusters 1420, 1430, and 1440 for local processing (e.g., warm storage tier 1404) as a cached version of data.

Cold storage tier 1406 may implement different types of data stores for storing, accessing, and managing data on behalf of clients 1410, 1412, 1414, etc. as a network-based service that enables clients 1410, 1412, 1414, etc. to operate a data storage system in a cloud or network computing environment. Cold storage tier 1406 may also include various kinds of object or file data stores for putting, updating, and getting data objects or files. For example, one cold storage tier 1406 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, cold storage tier 1406 may be treated as a data lake. For example, an organization may generate many different kinds of data, stored in one or multiple collections of data objects in a cold storage tier 1406. The data objects in the collection may include related or homogenous data objects, such as database partitions of sales data, as well as unrelated or heterogeneous data objects, such as audio files and web site log files. Cold storage tier 1406 may be accessed via programmatic interfaces (e.g., APIs) or graphical user interfaces. For example, format independent analytical database service 1400 may access data objects stored in data storage services via the programmatic interfaces.

As described above with regard to clients 170-190, clients 1410, 1412, 1414, etc. may encompass any type of client that can submit network-based requests to service provider network 100 via network 1408 (e.g., also network 160), including requests for storage services (e.g., a request to query data analytical service 150, or a request to create, read, write, obtain, or modify data in cold storage tier 1406 and/or data storage service 120, etc.).

FIG. 14B illustrates an example of a node cluster of an analytical database system performing queries against transactional database data, according to some embodiments. As illustrated in this example, a processing node cluster 1430 may include a leader node 1432 and compute nodes 1434, 1436, 1438, etc., which may communicate with each other over an interconnect (not illustrated). Leader node 1432 may implement query planning 1452 to generate query plan(s), query execution 1454 for executing queries on processing node cluster 1430 that perform data processing that can utilize remote query processing resources for remotely stored data (e.g., by utilizing one or more query execution slot(s)/queue(s) 1458). As described herein, each node in a primary processing cluster 1430 may include attached storage, such as attached storage 1468*a*, 1468*b*, and 1468*n*, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 1430 is a leader node as illustrated in FIG. 14B, but rather different nodes of the nodes in processing cluster 1430 may act as a leader node or otherwise direct processing of queries to data stored in processing cluster 1430. While nodes of processing cluster may be implemented on separate systems or devices, in at least some embodiments, some or all of processing cluster may be implemented as separate virtual nodes or instance on the same underlying hardware system (e.g., on a same server).

Leader node 1432 may manage communications with clients, such as clients 1410, 1412, and 1414 discussed above with regard to FIG. 14A. Leader node 1432 may receive query 1450 and return query results 1476 to clients 1410, 1412, 1414, etc. or to a proxy service (instead of communicating directly with a client application).

Leader node 1432 may be a node that receives a query 1450 from various client programs (e.g., applications) and/or subscribers (users) (either directly or routed to leader node 1432 from a proxy service), then parses them and develops an execution plan (e.g., query plan(s)) to carry out the associated database operation(s)). More specifically, leader node 1432 may develop the series of steps necessary to obtain results for the query. Query 1450 may be directed to data that is stored both locally within a warm tier implementing using local storage of processing cluster 1430 (e.g., at one or more of compute nodes 1434, 1436, or 1438) and data stored remotely, such as in cold storage tier 1406 (which may be implemented as part of data storage service 120, according to some embodiments). Leader node 1432 may also manage the communications among compute nodes 1434, 1436, and 1438 instructed to carry out database operations for data stored in the processing cluster 1430. For example, node-specific query instructions 1460 may be generated or compiled code by query execution 1454 that is distributed by leader node 1432 to various ones of the compute nodes 1434, 1436, and 1438 to carry out the steps needed to perform query 1450, including executing the code to generate intermediate results of query 1450 at individual compute nodes may be sent back to the leader node 1432. Leader node 1432 may receive data and query responses or results from compute nodes 1434, 1436, and 1438 in order to determine a final result 1476 for query 1450.

A database schema, data format and/or other metadata information for the data stored among the compute nodes, such as the data tables stored in the cluster, may be managed and stored by leader node 1432. Query planning 1452 may account for remotely stored data by generating node-specific query instructions that include remote operations to be directed by individual compute node(s). Although not illustrated, in some embodiments, a leader node may implement burst manager to send a query plan generated by query planning 1452 to be performed at another attached processing cluster and return results received from the burst processing cluster to a client as part of results 1476.

In at least some embodiments, a result cache 1456 may be implemented as part of leader node 1432. For example, as query results are generated, the results may also be stored in result cache 1456 (or pointers to storage locations that store the results either in primary processing cluster 1430 or in external storage locations), in some embodiments. Result cache 1456 may be used instead of other processing cluster capacity, in some embodiments, by recognizing queries which would otherwise be sent to another attached processing cluster to be performed that have results stored in result cache 1456. Various caching strategies (e.g., LRU, FIFO, etc.) for result cache 1456 may be implemented, in some embodiments. Although not illustrated in FIG. 14B, result cache 1456 could be stored in other storage systems (e.g., other storage services, such as a NoSQL database, and/or data storage service 120) and/or could store sub-query results.

Processing node cluster 1430 may also include compute nodes, such as compute nodes 1434, 1436, and 1438. Compute nodes, may for example, be implemented on servers or other computing devices, such as those described below with regard to computer system 1800 in FIG. 18, and each may include individual query processing "slices" defined, for example, for each core of a server's multi-core processor, one or more query processing engine(s), such as query engine(s) 1462*a*, 1462*b*, and 1464*n*, to execute the instructions 1460 or otherwise perform the portions of the query plan assigned to the compute node. Query engine(s) 1462 may access a certain memory and disk space in order to process a portion of the workload for a query (or other database operation) that is sent to one or more of the compute nodes 1434, 1436, or 1438. Query engine 1462 may access attached storage, such as 1468*a*, 1468*b*, and 1468*n*, to perform local operation(s), such as local operations 1466*a*, 1466*b*, and 1466*n*. For example, query engine 1462 may scan data in attached storage 1468, access indexes, perform joins, semi joins, aggregations, or any other processing operation assigned to the compute node 1434, 1436, or 1438.

Query engine 1462*a* may also direct the execution of remote data processing operations, by providing remote operation(s), such as remote operations 1464*a*, 1464*b*, and 1464*n*, to remote data processing clients, such as remote data processing 1470*a*, 1470*b*, and 1470*n*. Remote data processing 1470 may be implemented by a client library, plugin, driver or other component that sends request sub-queries to be performed by cold storage tier 1406 or requests to for data, 1472*a*, 1472*b*, and 1472*n*. As noted above, in some embodiments, Remote data processing 1470 may read, process, or otherwise obtain data 1474*a*, 1474*b*, and 1474*n*, in response from cold storage tier 1406, which may further process, combine, and or include them with results of location operations 1466.

Compute nodes 1434, 1436, and 1438 may send intermediate results from queries back to leader node 1432 for final result generation (e.g., combining, aggregating, modifying, joining, etc.). Remote data processing clients 1470 may retry data requests 1472 that do not return within a retry threshold.

Attached storage 1468 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column-oriented data formats or other data formats).

Although FIGS. 14A and 14B have been described and illustrated in the context of a service provider network implementing an analytical database service, like a data warehousing service, the various components illustrated and described in FIGS. 14A and 14B may be easily applied to other database services that can utilize the methods and systems described herein. As such, FIGS. 14A and 14B are not intended to be limiting as to other embodiments maintaining and querying representations of transactional data tables for managed databases.

Figure 15:
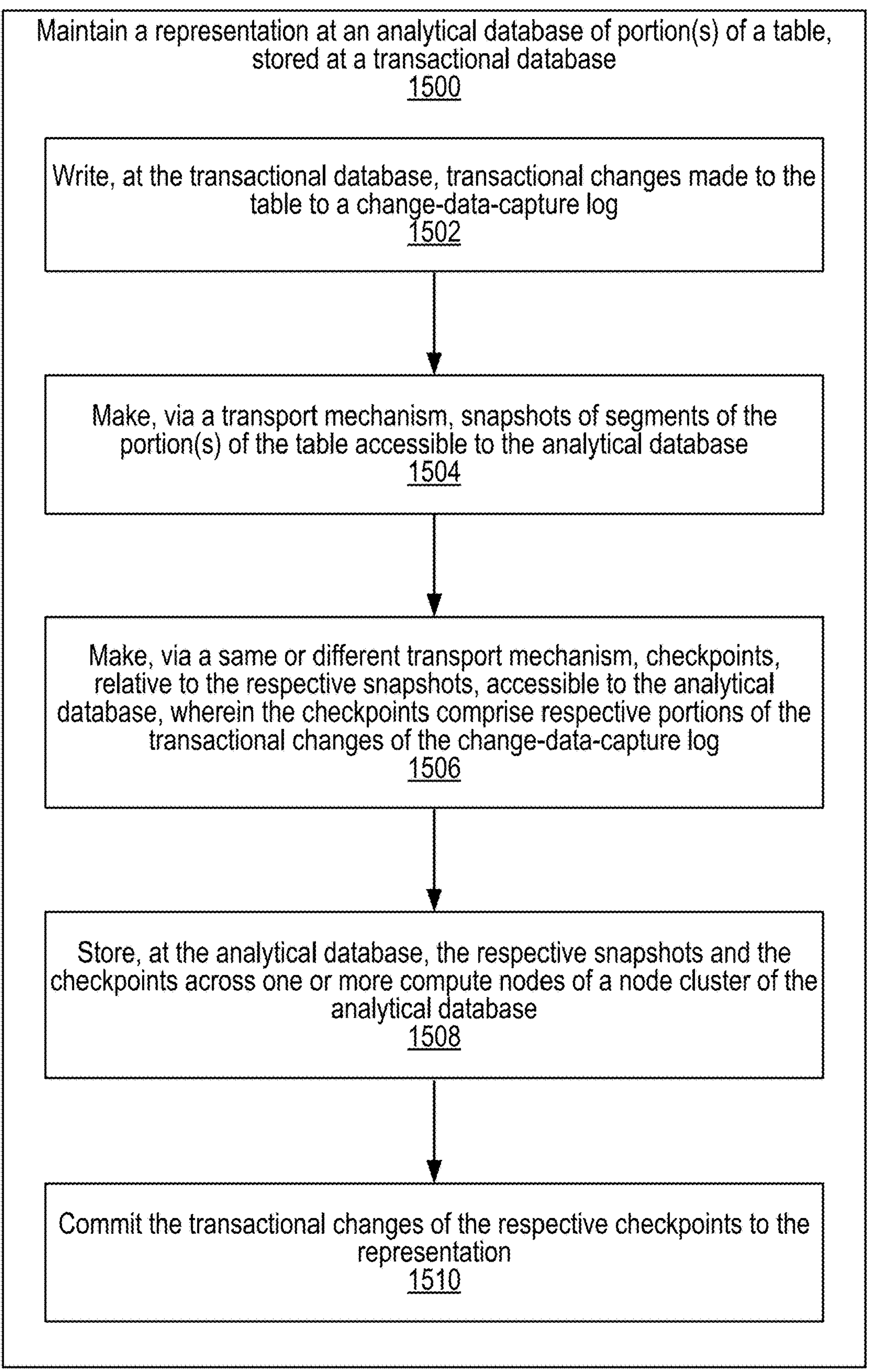
FIG. 15 is a flow diagram illustrating a process of maintaining, within an analytical database system, a representation of portions of a transactional data table from a transactional database system, according to some embodiments.

FIG. 15 is a flow diagram illustrating a process of maintaining, within an analytical database system, a representation of portions of a transactional data table from a transactional database system, according to some embodiments.

In some embodiments, maintaining representations of transactional tables at an analytical database, such as for the embodiments described herein, may include the following procedure steps. In the following embodiments shown in FIG. 15, it may be assumed that services of a provider network, such as transactional database service 110 and analytical database service 150 of service provider network 100, and the functionalities and techniques described for said services herein, may be used to implement a hybrid transactional and analytical processing service. However, a person having ordinary skill in the art should understand that other implementations and/or embodiments that fulfill the following procedure steps may also be incorporated to the description herein.

In block 1500, portion(s) of a table that are being maintained at a transactional database service 110, may be replicated to an analytical database, such as analytical database system 1400 of analytical database service 150, and subsequently maintained at the analytical database. In some embodiments, the means for maintaining a representation (e.g., a replica of portion(s) of a table from the transactional database) at the analytical database may use the procedure described in blocks 1502-1510.

Figure 16:
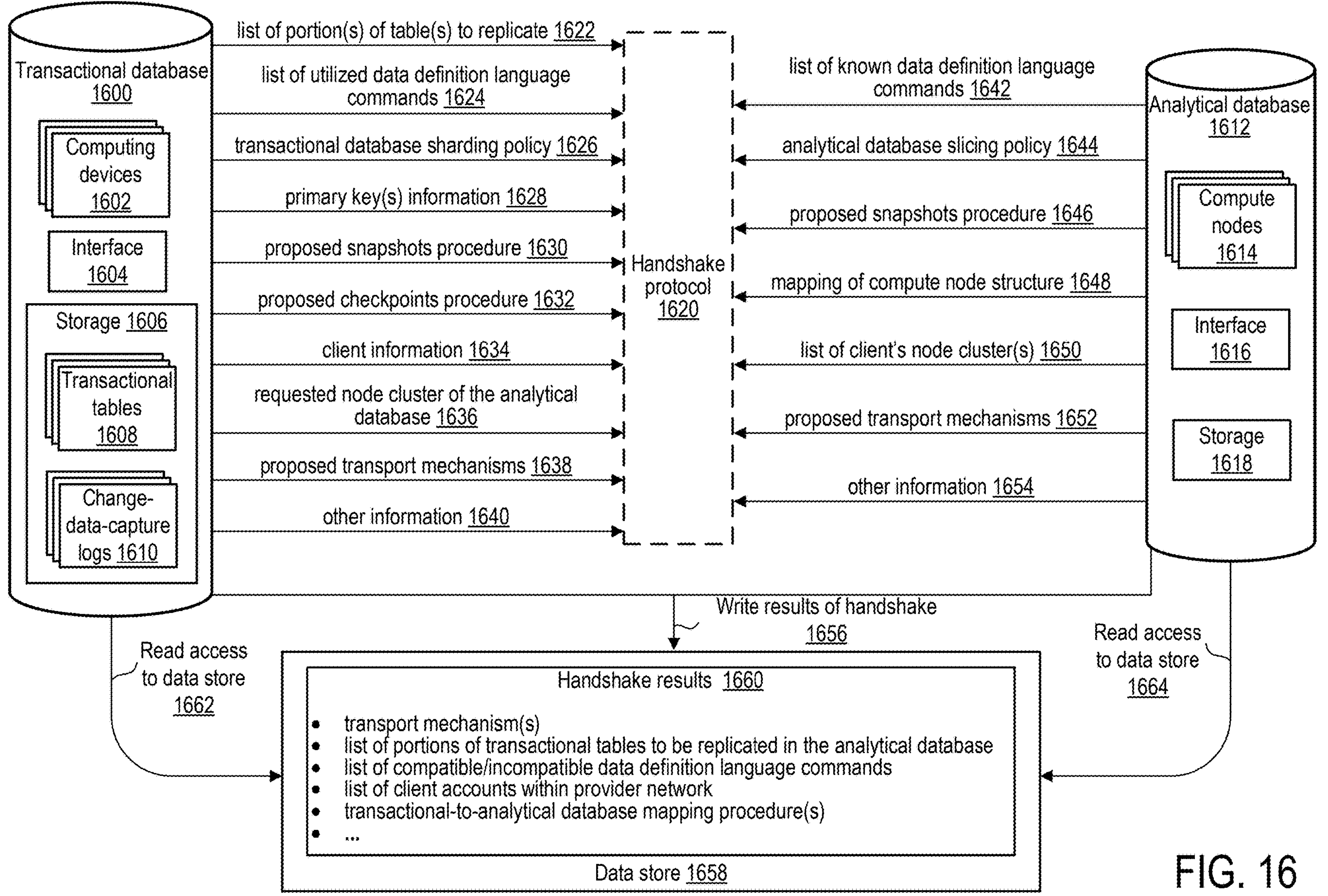
FIG. 16 illustrates the process of a handshake protocol, used to negotiate and define the configurations and parameters for maintaining, at an analytical database, a representation of a table stored in a transactional database, according to some embodiments.

In block 1502, transactional changes that are made to a transactional table that is stored and maintained in the transactional database are written to a change-data-capture log, such as transaction log (see also the description for at least change-data-capture logs 610 described herein with regard to FIG. 16). In block 1504, portion(s) of the table that have been chosen to be replicated into the analytical database are partitioned into segments such that the portion(s) may be provided to the analytical database. In some embodiments, such segments may be referred to as snapshots, as they refer to the state of the table at a given moment (e.g., at a certain transaction number in embodiments in which the table contains transactional data). The snapshots may be provided to the analytical database via a transport mechanism. In some embodiments, the transport mechanism may resemble a data storage service, such as data storage service 120, or a data streaming service, such as data streaming service 130, of service provider network 100. A person having ordinary skill in the art should understand that "snapshots" may be plural or singular depending upon given embodiments. For example, if only one portion of one transactional table is being replicated to the analytical database and may be provided as a unit (e.g., without being further partitioned) via the transport mechanism, "snapshot" may refer to the sum of the segments, according to some embodiments. In a second example, if a given portion of a given transactional table is partitioned into more than one segment, "snapshots" may refer to the segments that sum to the portion of the table being provided via the transport mechanism. Additional example embodiments may be given and the above examples should not be misconstrued as restrictive.

In block 1506, checkpoints are also provided to the analytical database. In some embodiments, checkpoints may resemble portions of transactional changes listed in the change-data-capture log of the transactional database for the given table portion(s) being replicated. In some embodiments in which more than one snapshot has been stored to respective compute nodes of a node cluster in the analytical database, respective checkpoints may also be partitioned based on this same mapping. In some embodiments, checkpoints may be provided to the analytical database by the same or different transport mechanism as the snapshots. For example, the snapshots may be provided via a data storage service, and the subsequent checkpoints may be streamed to the analytical database via a data streaming service.

In block 1508, the snapshots and checkpoints are stored in the analytical database. In some embodiments, the snapshots and their related checkpoints may be stored across multiple compute nodes of a node cluster of the analytical database (e.g., compute nodes 1434-1438 of node cluster 1430). The stored snapshots at the analytical database may now be referred to as the representation of the transactional portion (s) of the table maintained at the transactional database.

In block 1510, transactional changes that have been provided in the checkpoints are applied and committed to the representation, such that the representation is updated and maintained as a replica of the table stored in the transactional database. The process of receiving, applying, and committing additional checkpoints may continue as long as the hybrid transactional and analytical processing service maintains the representation in the analytical database. In addition, at any point after the storage of the first set of snapshots to the analytical database, a client of the hybrid transactional and analytical processing service may run a query against the transactional data in the representation, as the analytical database is configured to have simultaneous read/write properties (e.g., responding to the query and writing, applying, and/or committing new transactional changes to the representation).

FIG. 16 illustrates the process of a handshake protocol, used to negotiate and define the configurations and parameters for maintaining, at an analytical database, a representation of a table stored in a transactional database, according to some embodiments.

In some embodiments, a handshake protocol between the computing devices of the transactional database and the compute nodes of the analytical database may be used to determine the logistics of how a representation of a transactional table of the transactional database is going to be maintained at the analytical database. By determining such parameters and defining the procedures for providing and mapping the snapshots and checkpoints to compute nodes of a node cluster in the analytical database in advance of providing the initial snapshot(s), the transactional database and the analytical database may remain loosely coupled during the maintenance of the representation at the analytical database.

In some embodiments, transactional database 1600 may resemble a transactional database of transactional database service 110, and their functionalities described herein. Computing devices 1602 may resemble respective database engine head nodes. Interface 1604 (e.g., SQL interface to the database system) may be used as a submission platform for database clients providing incoming transactions to transactional database 1600. Storage 1606 may be storage of a distributed storage system in which transactional tables 1608 and corresponding change-data-capture logs 1610 for transactional tables 1608 are stored.

Analytical database 1612 may resemble analytical database system 1400 of analytical database service 150, according to some embodiments. Compute nodes 1614 may represent compute nodes of a given node cluster, such as compute nodes 1434-1438 of node cluster 1430. Interface 1616 (e.g., SQL interface to the database system) may be used as a client endpoint for client(s) 170 and 190, wherein said clients may submit queries such as query 1450, according to some embodiments. Storage 1618 may resemble attached storage 1468 of compute nodes 1434-1438, and/or remote storage such as cold storage tier 1406. Storage 1618 may be configured such that it may store one or more of snapshots of transactional tables 1608 in order to maintain respective representation(s) at the analytical database.

In some embodiments, computing devices 1602 and/or compute nodes 1614 may initiate a handshake procedure in preparation for maintaining one or more of transactional tables 1608 at analytical database 1612. Maintaining the representations of transactional tables 1608 may follow the methods described in at least blocks 1500, according to some embodiments. In order to efficiently and effectively maintain the representations of transactional tables 1608 at analytical database 1612, the handshake procedure may include negotiations between computing devices 1602 and compute nodes 1614 in order to determine data-type mappings, topology requirements, compatible/incompatible data definition language commands that may be written to change-data-capture logs 1610 and/or interpreted by compute nodes 1614. Negotiations 1622-1654 may represent examples of the information that may be exchanged and/or determined via computing devices 1602 and compute nodes 1614, according to some embodiments. A person having ordinary skill in the art should understand that handshake protocol 1620 is meant to be a visual representation of negotiations between computing devices 1602 at transactional database 1600 and compute nodes 1614 at analytical database 1612. Other negotiations of handshake protocol 1620 besides negotiations 1622-1654 may additionally be included in performing handshake protocol 1620, and negotiations 1622-1654 are meant to be example embodiments of the methods and techniques described herein pertaining to performing a handshake protocol (see also the description of FIG. 7 herein). In addition, handshake protocol 1620 may occur at computing devices 1602, compute nodes 1614, or at both computing devices 1602 and compute nodes 1614 through the interactions described in the following paragraphs. Furthermore, handshake protocol 1620 may involve a first stage in which computing devices 1602 provides information from all or parts of negotiations 1622-1640 to compute nodes 1614, and then a second stage in which compute nodes 1614 may respond with all or parts of negotiations 1642-1654, or vice versa. In other embodiments, handshake protocol 1620 may resemble a more iterative process. For example, computing devices 1602 may provide list of utilized data definition language commands 1624, and compute nodes 1614 may respond with list of known data definition language commands 1642, and another iteration pertaining to data definition language commands may occur in order to determine and/or confirm the results of the handshake protocol pertaining to data definition language commands. Then, a similar process may occur for negotiations 1626 and 1644, etc., until the handshake protocol is complete.

In some embodiments, computing devices 1602 may provide a list of portion(s) of table(s) to replicate 1622, wherein the portions are portions of transactional tables 1608 to be stored and maintained by storage 1618 and compute nodes 1614 at analytical database 1612. By consequence of determining the portion(s) of transactional tables 1608 to be maintained at analytical database 1612, list of portion(s) of table(s) to replicate 1622 may also be used to determine a list of the corresponding change-data-capture logs of change-data-capture logs 1610 that will be sent as checkpoints in order to maintain the transactional table representations at analytical database 1612, based on the information in negotiation 1622. Furthermore, computing devices 1602 may provide information about the primary keys that correspond to the list of portion(s) of table(s) to replicate 1622 in primary key(s) information 1628, according to some embodiments. In some embodiments, primary keys may correspond to unique row identifiers of respective transactional tables 1608, such that respective rows may be identified by compute nodes 1614 when applying transactional changes to representations of transactional tables 1608. For example, a given transactional table of transactional tables 1608 may contain an additional column of the table with respective row identifiers (e.g., row 1, row 2, row 3, etc. for each row in the given transactional table) that may be used as primary keys. In a second example, a concatenation of some subset of the columns for each row may be used as primary keys (e.g., a concatenation of the data items in column 1, column 2, and column 3 of the table). In a third example, primary keys of the given transactional table may be a concatenation of all columns in each row (e.g., a "hash" of all data items in each row). In some embodiments, computing devices 1602 may use negotiation 1628 to inform compute nodes 1614 that there is no current primary keys scheme for the list of portion(s) of table(s) to replicate 1622. In such embodiments, computing devices 1602 and compute nodes 1614 may determine, during handshake protocol 1620, to use a concatenation of all columns in each row (e.g., the "hash" example described above) as the method of communicating information (e.g., transactional changes) about rows of the given transactional tables. In some embodiments, negotiation 1628 may be referred to as determining a logic for generating respective primary keys, either via a provided primary key scheme or by determining to use a concatenation of all columns in each row, etc.

The results of the negotiation pertaining to primary key(s) information 1628 may be used during the maintenance of the representations at analytical database 1612, as, when providing checkpoints to compute nodes 1614, the primary keys scheme may be trusted as an agreed upon form of communication when referencing respective rows to which compute nodes 1614 should apply transactional changes of the checkpoints, according to some embodiments.

Computing devices 1602 may also provide a list of data definition language commands 1624 that are used when writing transactional changes to change-data-capture logs 1610, and compute nodes 1614 may provide a list of known data definition language commands 1642. Negotiations 1624 and 1642 may be used to generate a list of compatible and/or incompatible data definition language commands, according to some embodiments. Such a list of compatible/incompatible data definition language commands may be used with regard to providing/receiving checkpoints of portions of change-data-capture logs 1610 during the maintenance of representations of transactional tables 1608 at analytical database 1612. As the compatible/incompatible data definition language commands may be written to handshake results 1660 at the end of handshake protocol 1620, computing devices 1602 may preemptively trigger a new snapshot of a given table if computing devices 1602 determine that an incompatible data definition language command is included in a given checkpoint (or determine that there is a data definition language command in a given checkpoint that is not part of the list of compatible data definition language commands) during maintenance of the representations of transactional tables 1608. Alternatively, compute nodes 1614 may reactively request a new snapshot if compute nodes 1614 determine that an incompatible data definition language command has been received as part of a given checkpoint.

In some embodiments, computing devices 1602 may also provide transactional database sharding policy 1626, in which computing devices 1602 may propose a method of how to proportion the list of portion(s) of table(s) to replicate 1622 for storage in storage 1618 of analytical database 1612. A person having ordinary skill in the art should understand that the storage capacity and/or the way that the storage capacity is distributed across distributed storage at transactional database 1600 may differ from the storage capacity and/or the way that the storage capacity is distributed across attached storage 1468 and cold storage tier 1406 at analytical database 1612, and therefore a negotiation pertaining to a mapping of the storage of transactional tables 1608 at transactional database 1600 to the storage of the representations of transactional tables 1608 at analytical database 1612 may be included in handshake protocol 1620. As part of said negotiation, compute nodes 1614 may additionally, or alternatively, propose analytical database slicing policy 1644, pertaining to the storage capacity and/or the way that the storage capacity is distributed across attached storage 1468 and cold storage tier 1406 at analytical database 1612.

Computing devices 1602 may additionally provide a proposed snapshots procedure 1630, which may also be based on other negotiations 1622-1654, according to some embodiments. For example, a mapping procedure determined via transactional database sharding policy 1626 and analytical database slicing policy 1664 may further determine the way that snapshots of portion(s) of table(s) to replicate 1622 are proportioned (e.g., in preparation for storing and maintaining the portion(s) of the table(s) at multiple compute nodes of compute nodes 1614). In a second example, proposed snapshots procedure 1630 may be based on proposed transport mechanisms 1638 and proposed transport mechanisms 1652 (see continued description in the following paragraphs), in which partitioning and/or size constraints of the determined transport mechanisms may determine proposed snapshots procedure 1630, according to some embodiments. Furthermore, compute nodes 1614 may also or alternatively propose snapshots procedure 1646 as part of the negotiations of handshake protocol 1620. For example, depending upon how the representations of portion(s) of table(s) to replicate 1622 are going to be distributed across compute nodes 1614 of a given node cluster, compute nodes 1614 may propose an optimized method of receiving snapshots from transactional database 1600. Compute nodes 1614 may also provide information pertaining to the structure of analytical database 1612 via mapping of compute node structure 1648 (e.g., compute nodes 1614 may propose one or more node clusters that could be used to store and maintain list of portion(s) of table(s) to replicate 1622). For example, mapping of compute node structure 1648 may provide information about the number of compute nodes in a given node cluster, information about the storage capacity of said compute nodes, etc. Such information about the mapping of compute node structure 1648 may be used to determine methods for providing snapshots and checkpoints to analytical database 1612, according to some embodiments.

In some embodiments, computing devices 1602 may propose checkpoints procedure 1632 based at least in part on negotiations 1630 and 1646. Once a mapping of providing snapshots to compute nodes 1614 of the given node cluster at analytical database 1612 has been determined, computing devices 1602 may propose a corresponding mapping for checkpoints. Such mapping for checkpoints may include methods for partitioning change-data-capture logs 1610 into checkpoints that may be provided using the determined transport mechanisms (see description for proposed transport mechanisms 1638 and proposed transport mechanisms 1652 herein).

Handshake protocol 1620 may also include negotiations pertaining to the client whose transactional tables of transactional tables 1608 are going to be maintained at analytical database 1612 via the methods and techniques described herein. For example, if list of portion(s) of table(s) to replicate 1622 pertain to client 170 of transactional database service 110, client information 634. Continuing with this example, client 170 may also be a client of analytical database service 150, in which case compute nodes 1614 may provide list of client's node cluster(s) 1650, according to some embodiments. Furthermore, in addition to (or in response to) determining that client 170 is a client of transactional database service 110 and of analytical database service 150, computing devices 1602 may request a certain node cluster 1636 from the list of client's node cluster(s) 1650. A person having ordinary skill in the art should understand that negotiations 1634, 1636, and 1650 may take place iteratively, in combination with one another, or separately during the overarching process of performing handshake protocol 1620.

In some embodiments, one or more transport mechanisms may be used to provide snapshots and checkpoints to analytical database 1612. As part of handshake protocol 1620, computing devices 1602 may propose transport mechanisms 1638 and/or compute nodes 1614 may propose transport mechanisms 1652. For example, computing devices 1602 may propose to provide snapshots via a given service of service provider network 100, such as data storage service 120. Compute nodes 1614 may similarly propose to receive snapshots via a given service of service provider network 100 (e.g., a same or different transport mechanism than those proposed by proposed transport mechanisms 1638) in proposed transport mechanisms 1652. During negotiations 1638 and 1652, an agreed upon transport mechanism for providing snapshots to analytical database 1612 may be determined and written to handshake results 1660. In some embodiments, negotiations 1638 and 1652 may also be used to determine an agreed upon transport mechanism for providing checkpoints to analytical database 1612 in which said transport mechanism may be the same or different transport mechanism determined for providing snapshots. For example, computing devices 1602 and compute nodes 1614 may determine, via negotiations 1638 and 1652, that snapshots may be provided to analytical database 1612 via a first transport mechanism (e.g., data storage service 120), and that checkpoints may be provided to analytical database 1612 via a second transport mechanism (e.g., data streaming service 130).

A person having ordinary skill in the art should understand that additional information (e.g., other information 1640 and other information 1654) may additionally be used to determine results of handshake protocol 1620, and that negotiations 1622-1654 are meant to be example embodiments rather than an exhaustive list of negotiations that may take place during the performance of handshake protocol 1620.

In some embodiments, after performing handshake protocol 1620, results of the determined parameters for maintaining representations of transactional tables of transactional database 1600 at analytical database 1612 may be written, via write results of handshake 1656, to a data store, such as data store 1658, that is made accessible to transactional database 1600 and analytical database 1612. As discussed above, computing devices 1602 may write a portion of handshake results 1660 and compute nodes 1614 may write an additional portion of handshake results via write results of handshake 1656, resulting in handshake results 1660, or, alternatively, either computing devices 1602 or compute nodes 1614 may write the results of handshake protocol 1620, resulting in handshake results 1660. Data store 1658 may be located at a storage that is accessible to transactional database 1600 and analytical database 1612. For example, data store 1658 may be located in a given storage of data storage service 120, according to some embodiments. In a second example, data store 1658 may be located in storage of transactional database service 110, and data store 1658 may be made accessible to analytical database service 150 such that read access is given to both transactional database 1600 and analytical database 1612, according to some embodiments.

As shown in FIG. 16, transactional database 1600 may have read access to data store 1662 and analytical database 1612 may have read access to data store 1664. Read access to data store 1662 and 1664 may allow computing devices 1602 and compute nodes 1614 to refer to handshake results 1660 during the process of maintaining representations of transactional tables 1608 at analytical database 1612, according to some embodiments. For example, computing devices 1602 may use handshake results 1660 to verify that transactional changes in a given checkpoint that it will provide to analytical database 1612 do not contain incompatible data definition language commands listed in handshake results 1660. In a second example, compute nodes 1614 may use handshake results 1660 to verify the determined transport mechanism by which analytical database 1612 may expect to receive snapshots, according to some embodiments. Such example embodiments describe the "loose coupling" of transactional database 1600 with analytical database 1612 after the completion of handshake protocol 1620. By establishing standard processes and procedures for maintaining representations of transactional tables at analytical database 1612 during handshake protocol 1620, subsequent processes may be automated.

Furthermore, determined results of handshake results 1660 may not be edited and/or written to by computing devices 1602 or compute nodes 1614 via read access to data store 1662 or 1664, according to some embodiments. In some embodiments, updates or changes to the structure and/or configurations of transactional database 1600, analytical database 1612, and/or any other services of service provider network 100 that are utilized as transport mechanisms (e.g., data storage service 120, data streaming service 130, etc.) may cause handshake results 1660 to become out-of-date. In some embodiments in which it is determined that one or more of the determined results of handshake results 1660 should be updated or changed, either computing devices 1602, compute nodes 1614, or both computing devices 1602 and compute nodes 1614 may re-initiate a new handshake protocol 1620. One or more of the determined results may then be updated, modified, or changed based on performing the new handshake protocol 1620, and handshake results 1660 may be overwritten by updated determined results of the new handshake protocol 1620, according to some embodiments.

Figure 17:
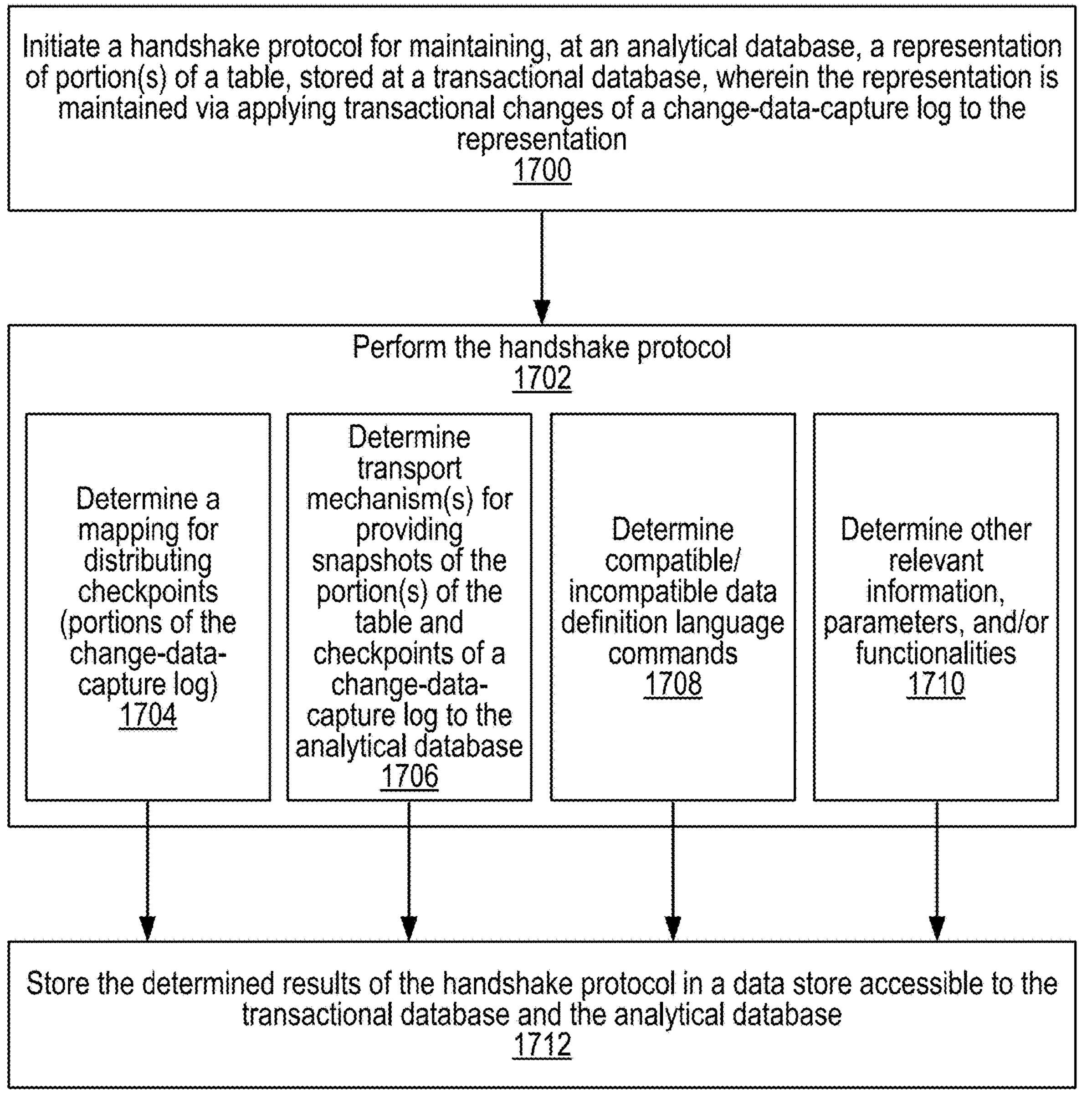
FIG. 17 is a flow diagram illustrating a process of initiating and performing a handshake protocol, used to negotiate and define the configurations and parameters for maintaining, at an analytical database, a representation of a table stored in a transactional database, according to some embodiments.

FIG. 17 is a flow diagram illustrating a process of initiating and performing a handshake protocol, used to negotiate and define the configurations and parameters for maintaining, at an analytical database, a representation of a table stored in a transactional database, according to some embodiments.

In some embodiments, the methods and techniques for performing handshake protocol 1620 may resemble the embodiments shown in FIG. 17 via blocks 1700-1712. In block 1700, a handshake protocol may be initiated in order to determine parameters for maintaining representations of transactional tables of the transactional database at the analytical database, according to some embodiments. As described above with regard to FIG. 16, the handshake protocol may be initiated by either the transactional database side of the hybrid transactional and analytical processing service, the analytical database side, or both. In block 1702, the handshake protocol is performed. Blocks 1704-1710 may represent embodiments of negotiations that may take place during performance of the handshake protocol, according to some embodiments. Blocks 1704-1710 are not meant to be an exhaustive list of negotiations, and additional negotiations not shown in FIG. 17 may take place during performance of the handshake protocol (e.g., block 1702).

In block 1704, a mapping for distributing checkpoints across compute nodes of a given node cluster of the analytical database may be determined. In some embodiments, block 1704 may resemble at least negotiations 1632 and 1648 and their descriptions herein. In block 1706, one or more transport mechanisms for providing snapshots and checkpoints to the analytical database may be determined. In some embodiments, block 1706 may resemble at least negotiations 1638 and 1652 and their descriptions herein. In block 1708, a list of data definition language commands may be agreed upon by the computing devices of the transactional database and the compute nodes of the analytical database during performance of the handshake protocol. In some embodiments, block 1708 may resemble at least negotiations 1624 and 1642. In block 1710, additional information may be determined during the performance of the handshake protocol such that additional parameters and/or functionalities for maintaining representations of transactional tables at the analytical database may be defined. In some embodiments, block 1710 may pertain to any additional negotiations of negotiations 1622-1654 that have not already been determined. Block 1710 may additionally refer to any negotiations that will promote a "loose coupling" of the transactional database and the analytical database after the completion of the handshake protocol and autonomous/automatic functionalities pertaining to maintaining representations of transactional tables at the analytical database.

In block 1712, the determined results of at least blocks 1704-1710 may be stored in a data store that is made accessible to the transactional database and the analytical database. In some embodiments, the data store of block 1712 may resemble data store 1658, which stores handshake results 1660.

Embodiments of the hybrid transactional and analytical processing methods and systems described herein may be executed on one or more computer systems, which may interact with various other devices. One such computer system is illustrated by FIG. 18. FIG. 18 is a block diagram illustrating a computer system that may implement at least a portion of the systems described herein, according to various embodiments. For example, computer system 1800 may implement a database engine head node of a database tier, or one of a plurality of storage nodes of a separate distributed storage system that stores databases and associated metadata on behalf of clients of the database tier, in different embodiments. Computer system 1800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1800 includes one or more processors 1810 (any of which may include multiple cores, which may be single or multi-threaded) coupled to a system memory 1820 via an input/output (I/O) interface 1830. Computer system 1800 further includes a network interface 1840 coupled to I/O interface 1830. In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA. The computer system 1800 also includes one or more network communication devices (e.g., network interface 1840) for communicating with other systems and/or components over a communications network (e.g. Internet, LAN, etc.). For example, a client application executing on system 1800 may use network interface 1840 to communicate with a server application executing on a single server or on a cluster of servers that implement one or more of the components of the database systems described herein. In another example, an instance of a server application executing on computer system 1800 may use network interface 1840 to communicate with other instances of the server application (or another server application) that may be implemented on other computer systems (e.g., computer systems 1890).

In the illustrated embodiment, computer system 1800 also includes one or more persistent storage devices 1860 and/or one or more I/O devices 1880. In various embodiments, persistent storage devices 1860 may correspond to disk drives, tape drives, solid state memory, other mass storage devices, or any other persistent storage device. Computer system 1800 (or a distributed application or operating system operating thereon) may store instructions and/or data in persistent storage devices 660, as desired, and may retrieve the stored instruction and/or data as needed. For example, in some embodiments, computer system 1800 may host a storage node, and persistent storage 1860 may include the SSDs attached to that server node.

Computer system 1800 includes one or more system memories 1820 that may store instructions and data accessible by processor(s) 1810. In various embodiments, system memories 1820 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1820 may contain program instructions 1825 that are executable by processor(s) 1810 to implement the methods and techniques described herein. In various embodiments, program instructions 1825 may be encoded in platform native binary, any interpreted language such as Java™ byte-code, or in any other language such as C/C++, Java™, etc., or in any combination thereof. For example, in the illustrated embodiment, program instructions 1825 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1825 may implement multiple separate clients, server nodes, and/or other components.

In some embodiments, program instructions 1825 may include instructions executable to implement an operating system (not shown), which may be any of various operating systems, such as UNIX, LINUX, Solaris™, MacOS™, Windows™, etc. Any or all of program instructions 1825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1800 via I/O interface 1830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1800 as system memory 1820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1840.

In some embodiments, system memory 1820 may include data store 1845, which may be implemented as described herein. For example, the information described herein as being stored by the database tier (e.g., on a database engine head node), such as a transaction log, an undo log, cached page data, or other information used in performing the functions of the database tiers described herein may be stored in data store 1845 or in another portion of system memory 1820 on one or more nodes, in persistent storage 1860, and/or on one or more remote storage devices 1870, at different times and in various embodiments. Similarly, the information described herein as being stored by the storage tier (e.g., redo log records, coalesced data pages, and/or other information used in performing the functions of the distributed storage systems described herein) may be stored in data store 1845 or in another portion of system memory 1820 on one or more nodes, in persistent storage 1860, and/or on one or more remote storage devices 1870, at different times and in various embodiments. In general, system memory 1820 (e.g., data store 1845 within system memory 1820), persistent storage 1860, and/or remote storage 1870 may store data blocks, replicas of data blocks, metadata associated with data blocks and/or their state, database configuration information, and/or any other information usable in implementing the methods and techniques described herein.

In one embodiment, I/O interface 1830 may coordinate I/O traffic between processor 1810, system memory 1820 and any peripheral devices in the system, including through network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments, some or all of the functionality of I/O interface 1830, such as an interface to system memory 1820, may be incorporated directly into processor 1810.

Network interface 1840 may allow data to be exchanged between computer system 1800 and other devices attached to a network, such as other computer systems 1890 (which may implement one or more storage system server nodes, database engine head nodes, and/or clients of the database systems described herein), for example. In addition, network interface 1840 may allow communication between computer system 1800 and various I/O devices 1850 and/or remote storage 1870. Input/output devices 1850 may, in some embodiments, include one or more display terminals, keyboards, keypads, touchpads, scanning devices, voice or optical recognition devices, or any other devices suitable for entering or retrieving data by one or more computer systems 1800. Multiple input/output devices 1850 may be present in computer system 1800 or may be distributed on various nodes of a distributed system that includes computer system 1800. In some embodiments, similar input/output devices may be separate from computer system 1800 and may interact with one or more nodes of a distributed system that includes computer system 1800 through a wired or wireless connection, such as over network interface 1840. Network interface 1840 may commonly support one or more wireless networking protocols (e.g., Wi-Fi/IEEE 802.11, or another wireless networking standard). However, in various embodiments, network interface 1840 may support communication via any suitable wired or wireless general data networks, such as other types of Ethernet networks, for example. Additionally, network interface 1840 may support communication via telecommunications/telephony networks such as analog voice networks or digital fiber communications networks, via storage area networks such as Fibre Channel SANs, or via any other suitable type of network and/or protocol. In various embodiments, computer system 1800 may include more, fewer, or different components than those illustrated in FIG. 18 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGs. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more computing devices configured to implement a transactional database, wherein the one or more computing devices are configured to:

maintain a table comprising data items; and write transactional changes made to the table to a change-data-capture log;

one or more compute nodes organized into a node cluster and configured to implement an analytical database, wherein the one or more compute nodes of the node cluster are configured to:

maintain a current representation of at least one portion of the table, wherein to maintain the current representation of at least one portion of the table comprises applying respective ones of the transactional changes of the change-data-capture log, received at the analytical database, to update the current representation of the at least one portion of the table; and maintain one or more historical representations of the at least one portion of the table, wherein to maintain the one or more historical representations of the at least one portion of the table comprises retaining versions of rows prior to applying the respective ones of the transactional changes, wherein the versions retained prior to applying the respective ones of the transactional changes are marked as inactive rows of the at least one portion of the table maintained at the analytical database.

2. The system of claim 1, wherein the analytical database is configured to:

receive a request to transition from maintaining the representation of the at least one portion of the table with historical mode disabled to maintaining the representation of the at least one portion of the table with historical mode enabled; and modify, in response to the request to enable historical mode, the representation of the at least one portion of the table to include additional columns indicating (1) whether the respective rows are active or inactive; (2) transaction numbers at which the respective rows become active; and (3) for inactive rows, transaction numbers at which the respective rows became inactive.

3. The system of claim 2, wherein the analytical database is configured to:

receive a request to transition from maintaining the representation of the at least one portion of the table with historical mode enabled to maintaining the representation of the at least one portion of the table with historical mode disabled; and modify, in response to the request to disable historical mode, the representation of the at least one portion of the table, wherein the modifications comprise:

deleting rows marked as inactive; and
deleting the additional columns.

4. The system of claim 3, wherein response to receiving the request to disable historical mode, the analytical database is further configured to:

store data representing the rows marked as inactive in a data object associated with the representation of the at least one portion of the table maintained by the analytical database prior to deleting the rows marked as inactive from the representation of the at least one portion of the table.

5. The system of claim 1, wherein:

a single database node of the transactional database manages the transaction table, and the node cluster of the analytical database that maintains the representation of the table comprises a leader node and a plurality of compute nodes, wherein the node cluster is further configured to:

cause data items that have been accessed less frequently to be demoted from being stored in the compute nodes of the node cluster to instead being stored in a separate distributed storage system; and cause queried data items to be promoted from being stored in the separate distributed storage system to being stored in the compute nodes of the node cluster.

6. A method, comprising:

accessing, by one or more computing devices implementing an analytical database, a change-data-capture log comprising changes made to one or more tables maintained by a transactional database;

maintaining, at the analytical database, a current representation of at least one portion of the table, wherein to maintain the current representation of at least one portion of the table comprises applying respective ones of the changes of the change-data-capture log to update the current representation of the at least one portion of the table; and maintaining, at the analytical database, one or more historical representations of the at least one portion of the table, wherein to maintain the one or more historical representations of the at least one portion of the table comprises retaining versions of rows prior to applying the respective ones of the transactional changes, wherein the versions retained prior to applying the respective ones of the transactional changes are marked as inactive rows of the at least one portion of the table maintained at the analytical database.

7. The method of claim 6, wherein current representation and the historical representation are maintained using a single table comprising additional columns indicating (1) whether respective rows of the single table are active or inactive rows; (2) transaction numbers at which the respective rows become active; and (3) for inactive rows, transaction numbers at which the respective rows became inactive.

8. The method of claim 7, further comprising:

receiving a query targeting historical data included in the one or more historical representations of the at least one portion of the table, wherein the query for the historical data includes information for determining a range of historical transaction numbers to be queried; and searching a table comprising the current representation and the one or more historical representations for rows that are indicated as inactive and that encompass, between a transaction number when the respective rows became active and a transaction number when the respective rows became inactive, a member of the range of historical transaction numbers to be queried.

9. The method of claim 7, further comprising:

receiving a query targeting a mixture of current and historical data included in the current representation and the one or more historical representations of the at least one portion of the table, wherein the query for the current and historical data includes information for determining a range of historical transaction numbers to be queried; and searching a table comprising the current representation and the one or more historical representations for rows that are indicated as active and for rows that are indicated as inactive and that encompass, between a transaction number when the respective rows became active and a transaction number when the respective rows became inactive, a member of the range of historical transaction numbers to be queried.

10. The method of claim 7, further comprising:

receiving a query targeting only current data included in the current representation of the at least one portion of the table; and searching a table comprising the current representation and the one or more historical representations for rows that are indicated as active.

11. The method of claim 7, wherein the current and historical representations of the at least one portion of the table is stored in the analytical database using a plurality of data blocks, wherein respective columns are stored in two or more data blocks stored by two or more nodes of a node cluster, and wherein the additional columns indicating (1) whether respective rows of the single table are active or inactive rows; (2) transaction numbers at which the respective rows become active; and (3) for inactive rows, transaction numbers at which the respective rows became inactive are added to each of the two or more nodes.

12. The method of claim 6, further comprising:

determining a query pattern of a given application that queries the analytical database; and pre-filtering the current and one or more historical representations to include currently active rows and a range of inactive rows that encompass transaction numbers within a range inferred from the determined query pattern.

13. The method of claim 7, further comprising:

receiving a request to transition from maintaining the representation of the at least one portion of the table with historical mode enabled to maintaining the representation of the at least one portion of the table with historical mode disabled; and modifying, in response to the request to disable historical mode, the representation of the at least one portion of the table, wherein the modifications comprise:

deleting rows marked as inactive; and
deleting the additional columns.

14. One or more non-transitory, computer-readable, storage media storing program instructions that, when executed using one or more processors, cause the one or more processors to:

maintain a current representation of at least one portion of a table also implemented in a transactional database, wherein to maintain the current representation of at least one portion of the table comprises applying respective transactional changes of a change-data-capture log, received at an analytical database, to update the current representation of the at least one portion of the table; and maintain one or more historical representations of the at least one portion of the table, wherein to maintain the one or more historical representations of the at least one portion of the table comprises retaining versions of rows prior to applying the respective ones of the transactional changes, wherein the versions retained prior to applying the respective ones of the transactional changes are marked as inactive rows of the at least one portion of the table maintained at the analytical database.

15. The one or more non-transitory, computer-readable, storage media of claim 14, wherein the program instructions, when executed on or across the one or more processors, further cause the one or more processors to:

receive a request to transition from maintaining the representation of the at least one portion of the table with historical mode disabled to maintaining the representation of the at least one portion of the table with historical mode enabled; and modify, in response to the request to enable historical mode, the representation of the at least one portion of the table to include additional columns indicating (1) whether the respective rows are active or inactive; (2) transaction numbers at which the respective rows become active; and (3) for inactive rows, transaction numbers at which the respective rows became inactive.

16. The one or more non-transitory, computer-readable, storage media of claim 14, wherein the program instructions, when executed on or across the one or more processors, further cause the one or more processors to:

receive one or more customer specified configuration parameters for maintaining the one or more historical representations of the at least one portion of the table; and maintain the one or more historical representations of the at least one portion of the table in accordance with the one or more customer specified configuration parameters, wherein said maintaining comprises:

demoting respective rows with transaction numbers at which the respective rows became inactive that indicate an age greater than a customer indicated threshold for retaining historical rows in a warm storage of the analytical database.

17. The one or more non-transitory, computer-readable, storage media of claim 14, wherein the program instructions, when executed on or across the one or more processors, further cause the one or more processors to:

receive one or more customer specified configuration parameters for maintaining the one or more historical representations of the at least one portion of the table; and maintain the one or more historical representations of the at least one portion of the table in accordance with the one or more customer specified configuration parameters, wherein said maintaining comprises:

deleting respective rows with transaction numbers at which the respective rows became inactive that indicate an age greater than a customer indicated threshold for retaining historical rows in the analytical database.

18. The one or more non-transitory, computer-readable, storage media of claim 14, wherein the program instructions, when executed on or across the one or more processors, further cause the one or more processors to:

receive a query targeting historical data included in the one or more historical representations of the at least one portion of the table, wherein the query for the historical data includes information for determining a range of historical transaction numbers to be queried; and search a table comprising the current representation and the one or more historical representations for rows that are indicated as inactive and that encompass, between a transaction number when the respective rows became active and a transaction number when the respective rows became inactive, a member of the range of historical transaction numbers to be queried.

19. The one or more non-transitory, computer-readable, storage media of claim 14, wherein the program instructions, when executed on or across the one or more processors, further cause the one or more processors to:

receive a query targeting a mixture of current and historical data included in the current representation and the one or more historical representations of the at least one portion of the table, wherein the query for the current and historical data includes information for determining a range of historical transaction numbers to be queried; and search a table comprising the current representation and the one or more historical representations for rows that are indicated as active and for rows that are indicated as inactive and that encompass, between a transaction number when the respective rows became active and a transaction number when the respective rows became inactive, a member of the range of historical transaction numbers to be queried.

20. The one or more non-transitory, computer-readable, storage media of claim 14, wherein the program instructions, when executed on or across the one or more processors, further cause the one or more processors to:

receive a query targeting only current data included in the current representation of the at least one portion of the table; and search a table comprising the current representation and the one or more historical representations for rows that are indicated as active.

* * * * *